US012579460B2

(12) United States Patent
Klimov

(10) Patent No.: US 12,579,460 B2
(45) Date of Patent: Mar. 17, 2026

(54) ITERATIVE SUPERVISED LEARNING OF QUANTUM PROCESSOR ERROR MODELS

(71) Applicant: Google LLC, Mountain View, CA (US)

(72) Inventor: Paul Victor Klimov, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 986 days.

(21) Appl. No.: 17/738,642

(22) Filed: May 6, 2022

(65) Prior Publication Data

US 2023/0359922 A1 Nov. 9, 2023

(51) Int. Cl.
G06N 10/70 (2022.01)
G06N 10/20 (2022.01)
G06N 10/60 (2022.01)
G06N 20/00 (2019.01)

(52) U.S. Cl.
CPC ............. G06N 10/70 (2022.01); G06N 10/20 (2022.01); G06N 10/60 (2022.01); G06N 20/00 (2019.01)

(58) Field of Classification Search
CPC ........ G06N 10/70; G06N 10/20; G06N 10/60; G06N 20/00
USPC ........................................................ 714/746
See application file for complete search history.

(56) References Cited

U.S. PATENT DOCUMENTS

2020/0334107 A1* 10/2020 Katabarwa ............. G06N 10/20
2020/0387822 A1 12/2020 Kilmov 2021/0081816 A1 3/2021 Klimov et al.
2021/0334689 A1 10/2021 Klimov et al.
2023/0023121 A1* 1/2023 Cao ........................ G06F 18/214
2023/0094389 A1* 3/2023 You ........................... G06N 5/01
706/62
2023/0359922 A1* 11/2023 Klimov .................. G06N 10/60

FOREIGN PATENT DOCUMENTS

WO WO2020/231378 11/2020
WO WO2021/118867 6/2021
WO WO2022/051030 3/2022

OTHER PUBLICATIONS

Basu et al., "i-QER: An Intelligent Approach Towards Quantum Error Reduction", arXiv:2110.06347v2. 19 pages.

(Continued)

*Primary Examiner* — John J Tabone, Jr.
(74) *Attorney, Agent, or Firm* — DORITY & MANNING P.A.

(57) ABSTRACT

Systems and methods for generating error models for quantum algorithms implemented on quantum processors having a plurality of qubits are provided. In one example, a method includes obtaining data associated with a benchmark model, the benchmark model having one or more error indicators as features, one or more benchmarks as targets, and one or more trainable parameters, wherein each error indicator is associated with a distinct quantum gate calibrated in a distinct operating configuration associated with a plurality of operating parameters for the quantum gate and associated with a calibration data for the operating configuration. The method includes determining parameter values for the trainable parameters. The method include operating a quantum computing system based on operating parameters determined based on the parameter values.

20 Claims, 19 Drawing Sheets

(56)                    References Cited

OTHER PUBLICATIONS

International Preliminary Report on Patentability for Application No. PCT/US2023/020949, mailed Nov. 21, 2024, 20 pages.

Kim et al., "Quantum Error Mitigation With Artificial Neural Network", IEEE International Access, 2020, 8 pages.

Liu et al., "Reliability Modeling of NISQ-Era Quantum Computers", IEEE International Symposium on Workload Characterization (IISWC), 2020, 12 pages.

Saki et al., "Experimental Characterization, Modeling, and Analysis of Crosstalk in a Quantum Computer", IEEE Transactions on Quantum Engineering, 2020, 6 pages.

Google AI Quantum et al., "Supplementary information for "Quantum supremacy using a programmable superconducting processor"", arXiv:1910.11333v2, dated Dec. 28, 2019, 67 pages.

* cited by examiner

200

202  Select Algorithm Metrics

204  Select Benchmarks

206  Select Operating Configurations

For each configuration

208  Calibrate

210  Sample Benchmarks

212  Build Training Data

214  Process Training Data

216  Iteratively Train a Model

218  Application

420

405

402

404

1600

1602

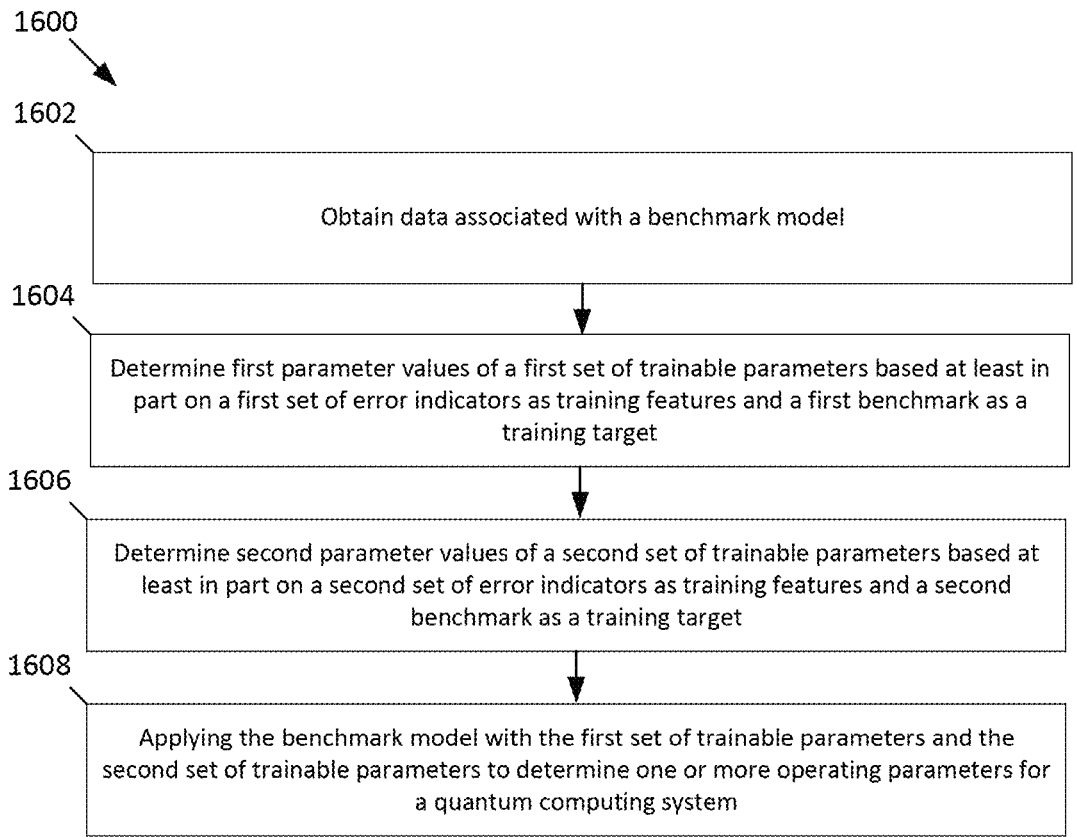

Obtain data associated with a benchmark model

1604

Determine first parameter values of a first set of trainable parameters based at least in part on a first set of error indicators as training features and a first benchmark as a training target

1606

Determine second parameter values of a second set of trainable parameters based at least in part on a second set of error indicators as training features and a second benchmark as a training target

1608

Applying the benchmark model with the first set of trainable parameters and the second set of trainable parameters to determine one or more operating parameters for a quantum computing system

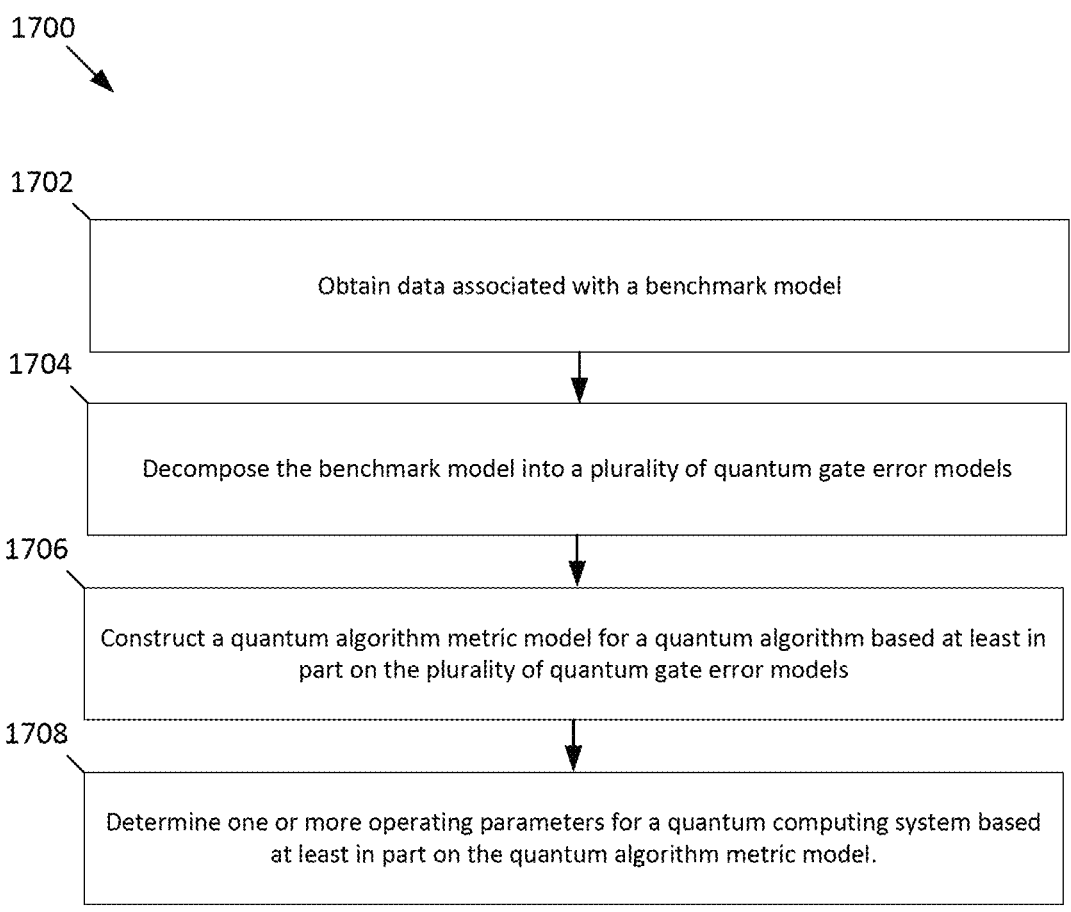

Obtain data associated with a benchmark model

Decompose the benchmark model into a plurality of quantum gate error models

Construct a quantum algorithm metric model for a quantum algorithm based at least in part on the plurality of quantum gate error models Determine one or more operating parameters for a quantum computing system based at least in part on the quantum algorithm metric model.

FIG. 18

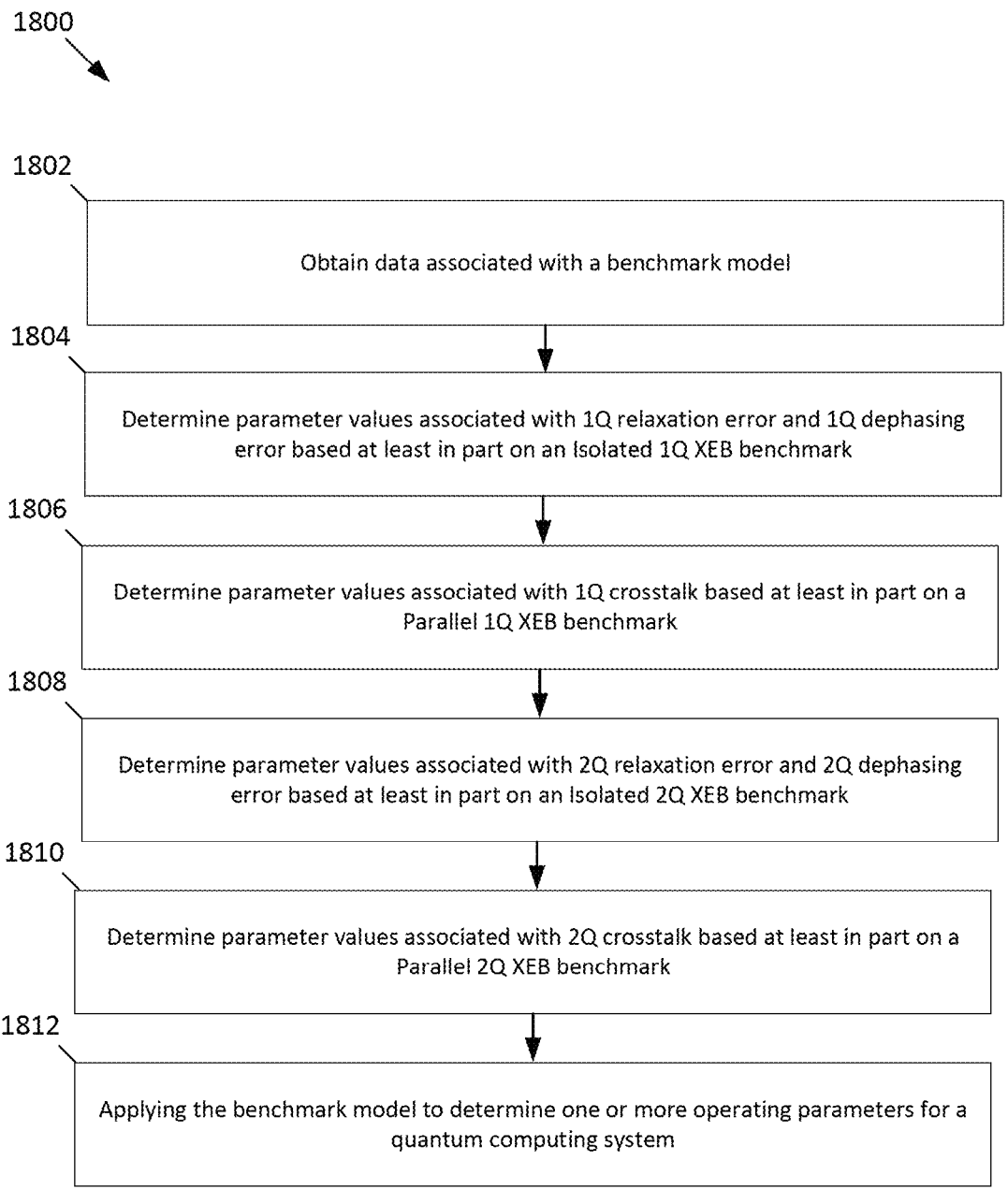

1800

1802

Obtain data associated with a benchmark model

1804

Determine parameter values associated with 1Q relaxation error and 1Q dephasing error based at least in part on an Isolated 1Q XEB benchmark

1806

Determine parameter values associated with 1Q crosstalk based at least in part on a Parallel 1Q XEB benchmark

1808

Determine parameter values associated with 2Q relaxation error and 2Q dephasing error based at least in part on an Isolated 2Q XEB benchmark

1810

Determine parameter values associated with 2Q crosstalk based at least in part on a Parallel 2Q XEB benchmark

1812

Applying the benchmark model to determine one or more operating parameters for a quantum computing system

FIG. 19

ITERATIVE SUPERVISED LEARNING OF QUANTUM PROCESSOR ERROR MODELS

FIELD

The present disclosure relates generally to quantum computing systems, and more particularly to iterative supervised learning of quantum processor error models operable to perform simulations of physical systems (e.g., quantum systems).

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

One example aspect of the present disclosure is directed a computer-implemented method for generating a benchmark model for a quantum algorithm to be implemented in a quantum computing system having a quantum processor. The method includes obtaining, by one or more computing devices, data associated with a benchmark model, the benchmark model having one or more error indicators as features, one or more benchmarks as targets, and one or more trainable parameters, wherein each error indicator is associated with a distinct quantum gate calibrated in a distinct operating configuration associated with a plurality of operating parameters for the quantum gate and associated with a calibration data for the operating configuration. The method includes determining, by the one or more computing devices, first parameter values of a first set of trainable parameters of the one or more trainable parameters based at least in part on a first set of error indicators as training features and a first benchmark as a training target. The method includes determining, by the one or more computing devices, second parameter values of a second set of trainable parameters of the one or more trainable parameters based at least in part on a second set of error indicators as training features and a second benchmark as a training target. The first set of trainable parameters is constrained by the first parameter values of the first set of trainable parameters during training of the second set of trainable parameters.

BRIEF DESCRIPTION OF THE DRAWINGS

Detailed discussion of embodiments directed to one of ordinary skill in the art is set forth in the specification, which refers to the appended figures, in which:

FIG. 17 depicts a flow diagram of an example method for generating a benchmark model for a quantum algorithm to be implemented in a quantum computing system having a quantum processor according to example embodiments of the present disclosure;

FIG. 18 depicts a flow diagram of an example method for mitigating errors in a quantum computing system comprising a quantum processor according to example embodiments of the present disclosure; and FIG. 19 depicts a flow diagram of an example method for generating a benchmark model for a quantum algorithm to be implemented in a quantum computing system having a quantum processor according to example embodiments of the present disclosure.

DETAILED DESCRIPTION

Figure 1:
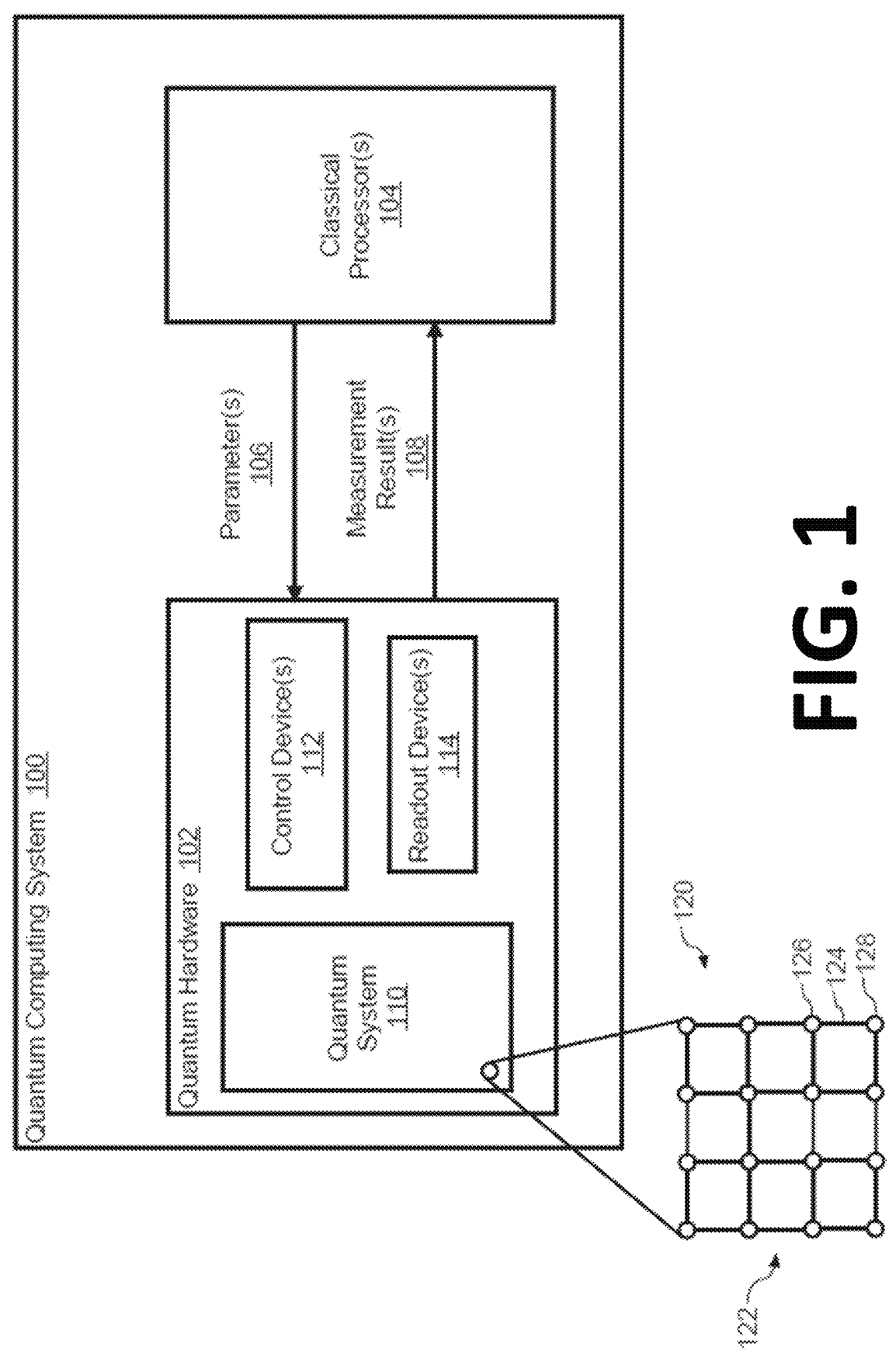
FIG. 1 depicts an example quantum computing system according to example embodiments of the present disclosure.

Example aspects of the present disclosure are directed to mitigating operating errors for quantum algorithms implemented on a quantum computing system. The quantum computing system can have a quantum processor(s) with one or more qubits. Error models can be constructed to estimate performance metrics of quantum algorithms based on operating parameters, gate calibration information, and other information associated with quantum gates acting on one or more qubits in a quantum computing system. However, direct measurement of performance metrics of an N-qubit quantum algorithm over sufficiently many operating parameters for a quantum computing system to train a machine-learned generalizable model can be intractable due to the computational requirements for building and processing training data for the model. Because of this complexity, it's desirable to build a model of O(N) qubit quantum algorithm performance metrics from simpler gate benchmarks taken on O(1) qubits.

For example, each algorithm metric sample can require calibration of O(N) gates to be calibrated at a distinct operating parameter and a run of the algorithm. Each sample can thus require significant computational resources and can take significant time (e.g., hours to days) to obtain in a realistic experimental setting. More specifically, consider a quantum processor having O(10) qubits. Example conservative parameters include N=10 qubits; 10 operating parameters (e.g., O(10)); 100 possible values of each parameter, discretized down to 10; 1 minute calibration time per parameter configuration; 1 second to sample a metric (e.g., negligible compared to calibration time); one 32-bit metric value for each configuration. This can lead to $10^{10}$ parameter configurations ($10^{-90}$ of full configuration space); about 40 GB to store the objective in memory; and about 19 k years to measure the objective over the discretized space. As demonstrated, direct measurement of algorithm metrics over even a significantly down-selected space is intractable.

Example aspects of the present disclosure can generate an error model that can estimate performance metrics for O(N) qubit quantum algorithms from measurements of O(1) qubit gate benchmarks with respect to a set of operating parameters. Quantum algorithm metrics can be estimated from simpler qubit gate benchmark models. Example quantum algorithms include, but are not limited to, search algorithms, random-circuit algorithms, error correcting algorithms, encryption algorithms, etc.

In one example implementation, an iterative supervised-learning procedure develops a benchmark model of a plurality of O(1) qubit gate benchmarks. The benchmarks can increase in complexity at each training iteration. The operating parameters trained at each iteration can be constrained by their values trained in past iterations. The process can start by training on simple benchmarks (e.g., gates operating isolation) intended to isolate error mechanisms (e.g., relaxation, dephasing) and progress towards more complex benchmarks (e.g., associated with quantum gates operating in parallel) intended to mirror or be associated with the quantum algorithm of interest (e.g., crosstalk). Once trained, the benchmark model can be decomposed into more foundational O(1) qubit gate error models. The qubit gate error models can be combined (e.g., based on a number of times the gates appear in the quantum algorithm and the operating context in which the gates appear) to estimate O(N) qubit quantum algorithm metrics.

Once constructed, the model of quantum algorithm metrics can be implemented to mitigate errors in a quantum computing system. For example, the model can be used for in-situ error-mitigation by way of optimizing the model for a quantum algorithm of interest over a plurality of different operating parameters for the quantum computing system. As such, the quantum computing system may then be operated at the optimized set of operating parameters or a set of operating parameters that provide increased performance. As another example, the error model can be used in the design of quantum processor architectures by providing an optimizable error budget for simulations of the quantum processor architectures over various architectural variables (e.g., electrical circuit configuration, qubit capacitances, Josephson-junction resistances, etc.) during the design of the quantum processor and prior to fabrication of the quantum processor.

Example aspects of the present disclosure can provide a number of technical effects and benefits. For instance, the iterative learning procedure according to example aspects of the present disclosure can be used to construct an error model for quantum algorithms using measurements of O(1) qubit gate benchmarks—significantly reducing computational time and resources needed to obtain training data and generate the model. The error model for the quantum algorithm can be used to mitigate errors in implementing algorithms in quantum computing systems, leading to improved scalability of quantum computing systems and increased reliability. Finally, quantum processor design and fabrication can be facilitated by providing a robust model for simulation of quantum processor architectures, leading to improved performance of quantum processors.

As used herein, a quantum processor includes one or more qubits that can implement quantum computations using quantum logic gates G on one or more qubits. In some embodiments, qubits in a quantum processor can be active or inactive. Active qubits can be involved in a benchmark or algorithm that may crosstalk with each other. Inactive qubits are not involved in a benchmark or algorithm and do not crosstalk with active qubits.

Computations can be performed using single qubit gates (1Q gates ($G_i$)) or two qubit gates (2Q gates ($G_{ij}$)) or other multi-qubit gates (e.g., three qubit gates, four qubit gates, etc.). The qubits can be superconducting qubits arranged, for instance, in a square lattice. Aspects of the present disclosure are discussed with reference to superconducting qubits for purposes of illustration and discussion. Those of ordinary skill in the art, using the disclosures provided herein, will understand that any suitable quantum processing architecture can be used without deviating from the scope of the present disclosure, such as ions, neutral-atoms, spin-qubits, quantum dots, photons, etc. Aspects of the present disclosure are discussed with reference to superconducting qubits for purposes of illustration and discussion. Those of ordinary skill in the art, using the disclosures provided herein understand that the techniques described herein can be used with any type of qubit (e.g., transmon, flux, gmon, xmon, ion traps, photonic devices, fluxmon qubits, silicon quantum dots, phosphorus impurity qubits, etc.). When different physical implementations of qubits are used, those implementations can have operating parameters and calibration data that are specific to the particular implementation.

An operating parameter is a quantum processor control parameter that can be varied (e.g., by a user or by instructions (e.g., software instructions)). Operating parameters are represented by an array $p=(p_0, \ldots p_N)$, where each $p_i$ corresponds to the value of one distinct operating parameter. Operating parameters can impact the performance of benchmarks and/or algorithm metrics. Various choices of p can render qubits active or inactive. Example operating parameter types for quantum processors with superconducting qubits include: single-qubit idle frequency; single-qubit gate frequency trajectory; two-qubit gate frequency trajectory; qubit readout frequency trajectory; qubit reset frequency trajectory; etc. One example software representation includes: $p_0$: Dictionary mapping gate $G_i$ to the respective qubit's single-qubit gate frequency; $p_1$: Dictionary mapping gate $G_{ij}$ to an array encoding the respective qubits' frequency trajectories used to execute a two-qubit gate; . . . .

Calibration data is defined as raw and/or analyzed calibration information and/or characterization information and/or metadata. Calibration data can be represented by an array $D=(D_0, \ldots D_N)$, where each $D_i$ corresponds to arbitrary data. Calibration data D in combination with a set of operating parameters p is used to compute error indicators for relevant gates G. Example datasets of calibration data for quantum processors with frequency-tunable superconducting transmon qubits include: maximum operating frequency; qubit frequency anharmonicity; qubit bias voltage to operating frequency; qubit/qubit coupling strength; Ramsey coherence time versus frequency; spin-echo coherence time versus frequency; CPMG dephasing time (T$\phi$) versus frequency; energy-relaxation time (T1) versus frequency; timestamp corresponding to when data was acquired, etc. One example software representation includes: $D_0$: Dictionary mapping qubit to Energy-relaxation time (T1) versus frequency; $D_1$: Dictionary mapping tuple (qubit i, qubit j) to coupling strength; . . . .

A benchmark is an error metric representative of the average performance of O(1) gates. Benchmarks may be represented by the array $B=(B_0, \ldots B_N)$, where each $B_i$ corresponds to one benchmark type or samples associated with that benchmark type. Benchmarks serve as "targets" (also sometimes "labels") in the supervised-learning pipeline discussed in more detail below. Example benchmark types include: single-qubit randomized benchmarking (RB) error; single-qubit cross-entropy benchmarking (XEB) error; two-qubit RB error; two-qubit XEB error; and two-qubit XEB purity error. Each benchmark type can be taken in a plurality of operating contexts, as determined by the operating parameters p. These operating contexts can be segregated into two categories depending on the active/inactive state of gates surrounding the gates being benchmarked. The distinction between them can be blurred in some operating contexts. An isolated benchmark is a benchmark for some gates G taken with surrounding qubits inactive. An isolated benchmark can help isolate, for instance, relaxation or dephasing. A parallel benchmark is a benchmark for some gates G taken with surrounding qubits active. For example, a parallel benchmark can help emulate crosstalk errors in a quantum algorithm. Benchmarks can be sampled to produce a sample, or measurement, of the benchmark. Each sample can correspond to a tuple of gates G, operating parameters p, and calibration data D.

An algorithm metric is a "system-scale" error metric representative of an average performance of O(N) gates executing a quantum algorithm. Algorithm metrics can be represented by an array $A=(A_0, \ldots A_N)$, where each $A_i$ corresponds to samples associated with one distinct algorithm metric type. In some embodiments, algorithm metrics can be estimated from a benchmark model of benchmarks B, provided that they are taken in a representative context. Example algorithm metrics include average error of a processor-scale parallel XEB experiment; average error of a processor-scale random circuit; average logical error in a quantum error correction code, etc.

An error indicator is a function $\varepsilon$ (G, p, D) that is indicative of benchmarks B of gates G at some parameter configuration p with corresponding calibration data D. Error indicators can be represented by the array $\varepsilon=(\varepsilon_0, \ldots \varepsilon_N)$, where each $\varepsilon_i$ corresponds to values associated with one distinct indicator. As discussed below, the error indicators can serve as "features" in the supervised learning framework.

In some embodiments, error indicators can be defined as either a component error of a gate (a "high-level" indicator) or a quantity that is believed to be related to the component error of a gate ("low-level" indicator). Low-level indicators and high-level indicators can be used interchangeably and/or can be used together. For example, low-level indicators can be used when the relationship between operating parameters, the calibration data, and error mechanisms are not understood well enough to define high-level indicators. In that case, the training procedure may surface key relationships that can be used to define high-level indicators. Example low-level indicators for superconducting qubits include: operating parameters; calibration data D; flux sensitivity during 1Q gates; average flux sensitivity during 2Q gates; CPMG dephasing rate during 1Q gates; average CPMG dephasing rate during 2Q gates; energy-relaxation rate during 1Q gates; average energy-relaxation rate during 2Q gates; leakage rate during 1Q gates; average leakage rate during 2Q gates; inverse-frequency-detuning $\Delta$ during simultaneous 1Q gates; inverse-frequency-detuning $\Delta$ during simultaneous 2Q gates; inverse-frequency-detuning $\Delta$ during simultaneous 1Q and 2Q gates; etc. Example high-level indicators for superconducting qubits can include: energy-relaxation error during 1Q gates (e.g., the corresponding low-level indicator is a "rate" and not an "error"); dephasing error during 1Q gates; control error during 1Q gates; energy-relaxation error during 2Q gates; dephasing error during 2Q gates; control error during 2Q gates; crosstalk between nearby 1Q/1Q gates; crosstalk between nearby 1Q/2Q gates; crosstalk between nearby 2Q/2Q gates; etc.

A model is a function that maps trainable parameters, gates, operating parameters, and/or calibration data to one or more benchmarks and/or algorithm metrics by way of error indicators. For instance, in one example embodiment, a model is Model(w, G, p, D) that maps trainable parameters w, arbitrary gates G, operating parameters p, and calibration data D onto one or more benchmarks B and/or algorithm metrics A by way of error indicators $\varepsilon$. Various arguments can be fixed or variable at various points. For instance, during training, the model can be Model (w|G, p, D) where w are parameters to be trained and G, p, D are fixed. During application, the model can be Model(G, p, D|w*) where w* are fixed trained parameters and G, p, D are variables. The model can be arbitrary and can range in complexity from including trivial weighting factors, to an algebraic expression, to a neural network, to a quantum simulation over error indicators. In some embodiments, the model can have sufficiently high capacity to capture non-trivial physics once trained on empirical training data but not too high a capacity to overfit the training data.

The complexity and type of model that is used can depend on the type of error indicators used. Lower-level indicators can use complex non-linear models to compensate for the lack of physical knowledge. On the other hand, higher-level indicators, which usually pack more physical information, may be more amenable to simpler linear models. Models that utilize higher-versus lower-level indicators can be segmented into physical models and non-physical models. Physical models can be physically motivated linear models over high-level indicators. Physical models can be non-trivial to define due to research overhead, but can reduce over/underfitting risk.

Physical models can be useful for developing error budgets to be used, for instance, for guiding metrology and/or quantum processor development. Physical models can be useful for application including calibration and/or in-situ error mitigation.

Non-physical models can be non-linear models with arbitrary functional forms over low-level indicators. Non-physical models may scramble indicators in a manner that is difficult to anchor to physics. Non-physical models can be useful for applications including calibration/n-situ error mitigation where a physically accurate error budget is not of increased importance. Non-physical models may achieve better predictivity by picking up non-intuitive trends and/or mechanisms not considered by the operator when constructing indicators.

Training data can be represented using any format. For instance, a table can provide for consistently packaging and training on samples from a wide array of benchmark experiments. The table can be indexed with reference to benchmarked gates G. Additionally and/or alternatively, the table can be indexed by operating parameters p at which the gates G were benchmarked. Additionally and/or alternatively, the table can be indexed by calibration data D corresponding to a state of the processor during benchmarks. Columns of the table can be or can include error indicators ε (e.g., training features). The error indicators ε may or may not be "identically zero." As one example, an error indicator corresponding to crosstalk will be identically zero for an Isolated 1Q XEB when sampled with one active qubit and all other qubits inactive. Some benchmarks B (e.g., training targets) may or may not apply depending on the corresponding operating parameters p. For example, a Parallel 2Q XEB may not be sampled in a configuration with one active qubit, selected for Isolated 1Q XEB.

Quantum algorithms of interest can be prohibitively complex to sample for many operating configurations p due to significant runtime and/or calibration overhead. This overhead may be far beyond what is necessary to sample B, and often is in practice. Therefore, in forthcoming examples, algorithm metrics may not be available at scale. If algorithm metrics are available at scale, they may be treated as benchmarks B over all gates G. The mathematical notation used herein is intended to be represented flexibly for the purpose of illustration of aspects of the present disclosure. It should be understood that example aspects of the present disclosure can be implemented in various software using any suitable variety of data structures and/or algorithms in their implementation without departing from the scope and spirit of the present disclosure.

Example aspects of the present disclosure are intended to apply to algorithm metrics A associated with any suitable quantum algorithm, such as, for example, a processor-scale random circuit or a quantum error correction experiment. For instance, some example implementations described herein employ a processor-scale random circuit as the quantum algorithm of interest and average error of the processor-scale random circuit as the algorithm metric of interest. It should be understood that any suitable algorithm and/or algorithm metric can be used according to example aspects of the present disclosure.

Based at least in part on the quantum algorithm and/or algorithm metrics of interest, benchmarks B can be selected that are useful in training models to predict metrics associated with the quantum algorithm. Benchmarks B that progress in modeling complexity, often leading to a natural progression from isolated benchmarks to parallel benchmarks, can be useful in many cases. Isolated benchmarks can be chosen to isolate error mechanisms, such as relaxation, dephasing, or crosstalk errors, such as error mechanisms on few gates operating simultaneously. Parallel benchmarks can be chosen to surface system-scale error mechanisms, such as, for example, crosstalk due to nearby gates operating simultaneously, in a way that mirrors the quantum algorithm of interest.

As one example, cross-entropy benchmarking (XEB) can be used as a benchmark. Cross-entropy benchmarking can be useful in, for example, modeling a processor-scale random circuit. As one example, cross-entropy benchmarking can measure 1Q and 2Q gate errors averaged over computational states and gates. Additionally and/or alternatively, cross-entropy benchmarking can be sampled in a variety of operating contexts to selectively isolate and/or surface various error mechanisms. Example cross-entropy benchmarks include, but are not limited to, an Isolated 1Q XEB (cross-entropy benchmarking on a 1Q gate Gi with other gates inactive), Isolated 2Q XEB (cross-entropy benchmarking on a 2Q gate $G_{ij}$ and 1Q gates $G_i$ and $G_j$, with other gates inactive), Parallel 1Q XEB (cross-entropy benchmarking on all 1Q gates simultaneously, where 1Q gate patterns are selected to mirror the quantum algorithm of interest), and/or Parallel 2Q XEB (cross-entropy benchmarking on all 2Q and 1Q gates simultaneously, where 2Q gate patterns are selected to mirror the quantum algorithm of interest and 2Q and 1Q gates alternate in time). For the purposes of brevity herein, Isolated 2Q XEB and/or Parallel 2Q XEB may be indexed by $G_{ij}$ only, with $G_i$ and $G_j$ implicit.

It can be beneficial in building a model with appropriate generalization capability to sample the benchmarks B over a rich set of operating parameter configurations p and/or corresponding error indicators ε. For instance, it can be desirable when the trained model is evaluated in the context of an application that the evaluation relies less on extrapolation, which is assumed to be less reliable, and more on interpolation, which is assumed to be more reliable. Sufficiently sampling benchmarks can be performed according to sampling criteria.

As one example, sampling criteria can include a sufficiently sized spread for each error indicator $\varepsilon_i$. As one example, the spread sampled for each indicator, defined as $\Delta\varepsilon_i = \max(\varepsilon_i) - \min(\varepsilon_i)$, can desirably exceed the uncertainty in that indicator $\sigma\varepsilon_i$. For instance, it can be desirable that the ratio of the spread to the uncertainty is significantly greater than one, or $\Delta\varepsilon_i/\sigma\varepsilon_i \gg 1$. Uncertainty can arise, for example, from drift and/or fit uncertainty.

As another example, sampling criteria can include sampling a sufficiently representative spread in each error indicator $\varepsilon_i$. For instance, the spread $\Delta\varepsilon_i$ can desirably span values that are reasonable during realistic quantum processing. If the spread $\Delta\varepsilon_i$ is too small, then the eventual trained model may be less likely to generalize well, because the generalization may rely more on extrapolation than interpolation.

As another example, sampling criteria can include sampling in a manner that does not confound error indicators. It is also possible to vary parameter configurations in a manner that varies many indicators simultaneously, potentially confounding their impact on error. As another example, sampling criteria can include sampling in a manner that does not falsely correlate error indicators. As one example, for techniques such as dephasing, where error increases as qubits are operated away from their maximum frequencies, and pulse-distortion, where error increases as qubit 2Q gate frequencies deviate further from their idle frequencies, if all 2Q gate benchmarks are sampled with qubits idling at maximum frequencies, it can be difficult or impossible to disentangle dephasing from pulse-distortion.

As another example, sampling criteria can include generating samples in reasonable time. For instance, some implementations may require that processors be recalibrated at new operating parameters before benchmarking. Because recalibration can happen on time frames of up to days, in some cases, parameters should be chosen judiciously, such that samples can be generated in a reasonable time.

Implementations according to aspects of the present disclosure can desirably meet as many of the above sampling criteria as plausible while also limiting the number of operating parameter configurations, corresponding calibrations, and, ultimately, runtime. Efficiency of a sampling scheme can additionally depend on an operator's understanding of how error indicators trend with respect to operating parameters. Example sampling schemes include focused sampling, random sampling, sweep sampling, and/or parallel sampling. It should be understood that any suitable sampling scheme(s), including combinations of these and/or other sampling schemes, can be used for generating training data in accordance with aspects of the present disclosure.

A table of training data can be built from sampled benchmarks. For instance, benchmarks as described herein can be added to the training data table at respective indices of gates G, operating parameters p, and/or calibration data D. In some implementations, samples can be filtered to, for example, discard values that are anomalous (e.g., anomalously high or low), which may be indicative of a sampling error. Error indicators for each sample can be computed from the gates, operating parameters, and/or calibration data and added to the training data table. As one example, when predicting cross-entropy benchmarks, an example reduced set of high-level indicators can include: energy-relaxation error during 1Q gates $\varepsilon_{Gi}[T_1]$; dephasing error during 1Q gates $\varepsilon_{Gi}[T_\phi]$; energy-relaxation error during 2Q gates $\varepsilon_{Gij}[T_1]$; dephasing error during 2Q gates $\varepsilon_{Gij}[T_\phi]$; crosstalk between nearby 1Q/1Q gates $\varepsilon_{Gi/Gj}[\Delta]$; crosstalk between nearby 2Q/2Q gates $\varepsilon_{Gij/Gkl}[\Delta]$.

A specific definition is applied for these indicators depending on benchmark type. For instance, for 2Q benchmarks (e.g., for Isolated 2Q XEB or Parallel 2Q XEB), the 1Q indicators are taken to sum the participating qubit indicators (e.g., for G01, the indicator $\varepsilon_{Gi}[T_1]=\varepsilon_{G0}[T_1]+\varepsilon_{G1}[T_1]$). For relevant benchmarks, 1Q/1Q crosstalk on Gi is taken to be $\varepsilon_{Gi/Gj}[\Delta]=\Sigma_j\varepsilon_{Gi/Gj}[\Delta]$, where Gj are all 1Q gates that crosstalk with Gi. For relevant benchmarks, 2Q/2Q crosstalk on $G_{ij}$ is taken to be $\varepsilon_{Gij/Gkl}[\Delta]=\Sigma_{kl}\varepsilon_{Gij/Gkl}[\Delta]$ where Gkl are 2Q gates that crosstalk with Gij. This definition constrains the trainable parameters corresponding to each indicator to be identical for all applicable gates.

This constraint can lead to models with good predictive performance, especially when design variations, fabrication variations, control variations, and/or other significant variations between qubits and respective gates are kept small. Additionally and/or alternatively, employing this constraint in a linear model can lead to a manageable model capacity O(k), where k is a number of indicators. If, however, these variations are large, it can be desirable to resolve indicators by gate to train models with good predictive performance. For instance, the single indicator $\varepsilon_{Gi}[T_1]$ and respective column may be expanded into multiple error indicators $\varepsilon_{G0}[T_1], \ldots, \varepsilon_{GN}[T_1]$ and respective columns for each gate. Employing this strategy in a linear model may lead to a less manageable model capacity O(N), where N is the number of qubits in the processor. Furthermore, this strategy may increase the amount of data needed to train w and may generally be more susceptible to overfitting. Nonetheless, this strategy may be desirable in some implementations, such as for contemporary near-therm flagship processors.

In some cases, a well-performing error model can be developed without utilizing every error indicator. For instance, some error indicators may be more or less predictive and/or redundant. According to example aspects of the present disclosure, a correlation matrix of the training data can be computed to identify error indicators that are likely to be most predictive, least predictive, and/or redundant. The correlation matrix can represent presence of and/or degree of correlation between error indicators and/or benchmarks. As one example, for high-level indicators, indicators that are more strongly correlated with benchmarks are likely to be the most predictive, whereas indicators that are uncorrelated or have a low degree of correlation with benchmarks may be unnecessary for prediction. As another example, indicators that are strongly correlated with one another may be redundant and/or may be constrainable to reduce the capacity of the final model. Information in the correlation matrix (and/or comparable data structures) can be used to refine indicators and/or improve the performance of the model. For instance, the correlation matrix carries information that may be used to refine error indicators and eventually trained models.

A trainable model can be defined for producing a benchmark model. Defining trainable models generally requires expert knowledge of quantum processor architecture and quantum algorithm of interest. Models may depend on the types of indicators used and/or application for which they are being trained. Example models include linear models, nonlinear models such as, for example, neural network models, and/or quantum simulation models. Any suitable trainable model can be employed according to example aspects of the present disclosure.

The trainable model can be trained based at least in part on a training cost function. The training cost function can provide a distance metric between the trainable model and benchmark samples (e.g., in the training data). One example training cost function is a least-squares L2 cost function. For instance, the least-squares L2 cost function can be defined as: $Cost(w|G, p, D, B)=\Sigma_{benchmarks}\Sigma_{samples}[Model(w|G, p, D)-B]^2+L(w|G, p, D, B)$. The function $L(w|G, p, D, B)$ may be an arbitrary regularization function that may be used to impose constraints on model parameters and/or downselect error indicators. Any suitable cost function can be used in accordance with the present disclosure. Additionally and/or alternatively, the trainable model can be trained based at least in part on a training optimizer. The training optimizer can minimize the cost function with respect to the trainable parameters w to find some output (e.g., optimal or near-optimal) values of the trainable parameters w*. As an example, the training optimizer can solve the generic problem: $w^*\equiv argmin_w Cost(w|G, p, D, B)$. One example training optimizer can be or can utilize gradient descent. Any suitable training optimizer can be used in accordance with the present disclosure. Hyperparameters, batch sizes, epochs, etc. can be determined based at least in part on training data, cost function, and/or other suitable parameters.

The benchmark model can be trained according to an iterative supervised-learning training procedure for training the model to predict benchmarks B, according to example aspects of the present disclosure. Generally, the model can be iteratively trained on samples corresponding to one or more judiciously-chosen benchmark types. Some implementations begin with benchmark types requiring the fewest indicators and corresponding model parameters to predict, then progress towards benchmark types requiring the most indicators and corresponding model parameters to predict. This progression can be in the direction from isolated to parallel benchmarks and/or fewer to more gates benchmarked simultaneously. However, any suitable progression, including deviations from those described herein, can be used in accordance with example aspects of the present disclosure. The trainable parameters are increasingly constrained by their values learned during previous iterations such that values of a subset of the trainable parameters are learned and/or refined in each iteration until all values have converged at the end of the final iteration.

For instance, one example method implementing this iterative training procedure includes selecting the training cost function, optimizer, and other relevant parameters. The method then includes defining a benchmark model Model (w|G, p, D) for predicting (e.g., all) benchmark types B. In some implementations, the method includes sorting benchmarks $B_i$ in B, in order of increasing prediction complexity. Example definitions of prediction complexity include, but are not limited to: length $|w_i=w[ \ldots ]|$ of the minimal subarray of w necessary to predict $B_i$; length $|\varepsilon_i=\varepsilon[ \ldots ]|$ of the subarray of $\varepsilon$ that are not identically zero for $B_i$. The method can additionally include defining a number of training iterations N and/or which benchmark types $B_{iteration}$ from B to target during each iteration. Examples of benchmark targeting include, but are not limited to: $B_{iteration}=B$ [iteration]; $B_{iteration}=B[0:iteration]$ (each successive iteration may include samples of benchmark types from all previous iterations); $B_{iteration}=B$ (iterative or non-iterative procedure, in which the one or more training rounds may contain samples from all benchmark types). For each iteration in $(0, \ldots, N)$, the method can include: sampling $(G, p, D)$ samples for $B_{iteration}$ and splitting the samples into testing, training, and/or validation sets; training the benchmark model Model(w|G, p, D) on splits of $B_{iteration}$ to learn some parameters $w_{iteration}*$ (e.g., tuning hyperparameters, validating, and testing per standard protocols); and/or constraining $w_{iteration}$ for future iterations by trained parameters $w_{iteration}*$. In some implementations, constraining the parameters for future iterations can include a rigid constraint (e.g., rigidly fixing $w_{iteration}$ in w to $w_{iteration}*$) and/or a penalized constraint (e.g., penalizing $w_{iteration}$ in w for deviating from $w_{iteration}*$ with e.g. a linear and/or quadratic penalty). After the final iteration, the method has produced the trained model Model(G, p, D|w*). The trained parameters w* are now fixed and the index (G, p, D) is now variable, as in application usage. Examples of these techniques will be discussed in greater detail with reference to cross-entropy benchmark training. These techniques can be extended to other benchmarks and/or quantum algorithms according to example aspects of the present disclosure.

The trained benchmark model can be used to produce a quantum algorithm metric model useful for evaluating performance of a quantum algorithm with given operating parameters. If algorithm metric samples are available at sufficiently many operating parameter configurations p, the iterative training process described above can be applied by treating algorithm metrics A as additional benchmark types B over all gates G. However, algorithm metrics can be prohibitively difficult to sample over sufficiently many parameter configurations to be useful in training, for example in cases where the complexity and/or runtime of calibrating O(N) gates and/or algorithm runtime is prohibitively expensive. Example aspects of the present disclosure provide for predicting an algorithm metric model from simpler (e.g., O(1)) qubit gate benchmark models. According to example aspects of the present disclosure, gates can be benchmarked in a context representative of the quantum algorithm of interest.

For instance, according to example aspects of the present disclosure, a trained benchmark model can be decomposed into one or more quantum gate models. In some implementations, the benchmark model can include algorithm-dependent components and/or algorithm-independent components that can be used in decomposition. The quantum gate models can be models of, for example, 1Q and/or 2Q gates, and/or any other suitable quantum gates. The quantum gate models can then be used to construct a quantum algorithm metric model.

In some cases, at the start of a training procedure, desirable model type of the trainable model, such as linear model vs. non-linear model, and/or types of error indicators (e.g., for predictability and/or generalization) may not be explicitly known. Thus, some implementations according to example aspects of the present disclosure can include selecting a trainable model from a plurality of candidate trainable models. Additionally and/or alternatively, some implementations can include selecting the one or more error indicators from a plurality of candidate error indicators. One example framework for selecting the trainable model and/or indicators is k-fold cross validation, where multiple candidate models and/or combinations of error indicators are trained on multiple testing/training/validation training data splits. The model ultimately having the highest performance is selected as the trained benchmark model. Model performance can be evaluated in any suitable method, such as correlation between predicted and measured benchmarks.

With reference now to the FIGS., example embodiments of the present disclosure will be discussed in further detail. As used here, the use of the term "about" in conjunction with a value refers to within 20% of the value.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates G, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency(s) and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Figure 2:
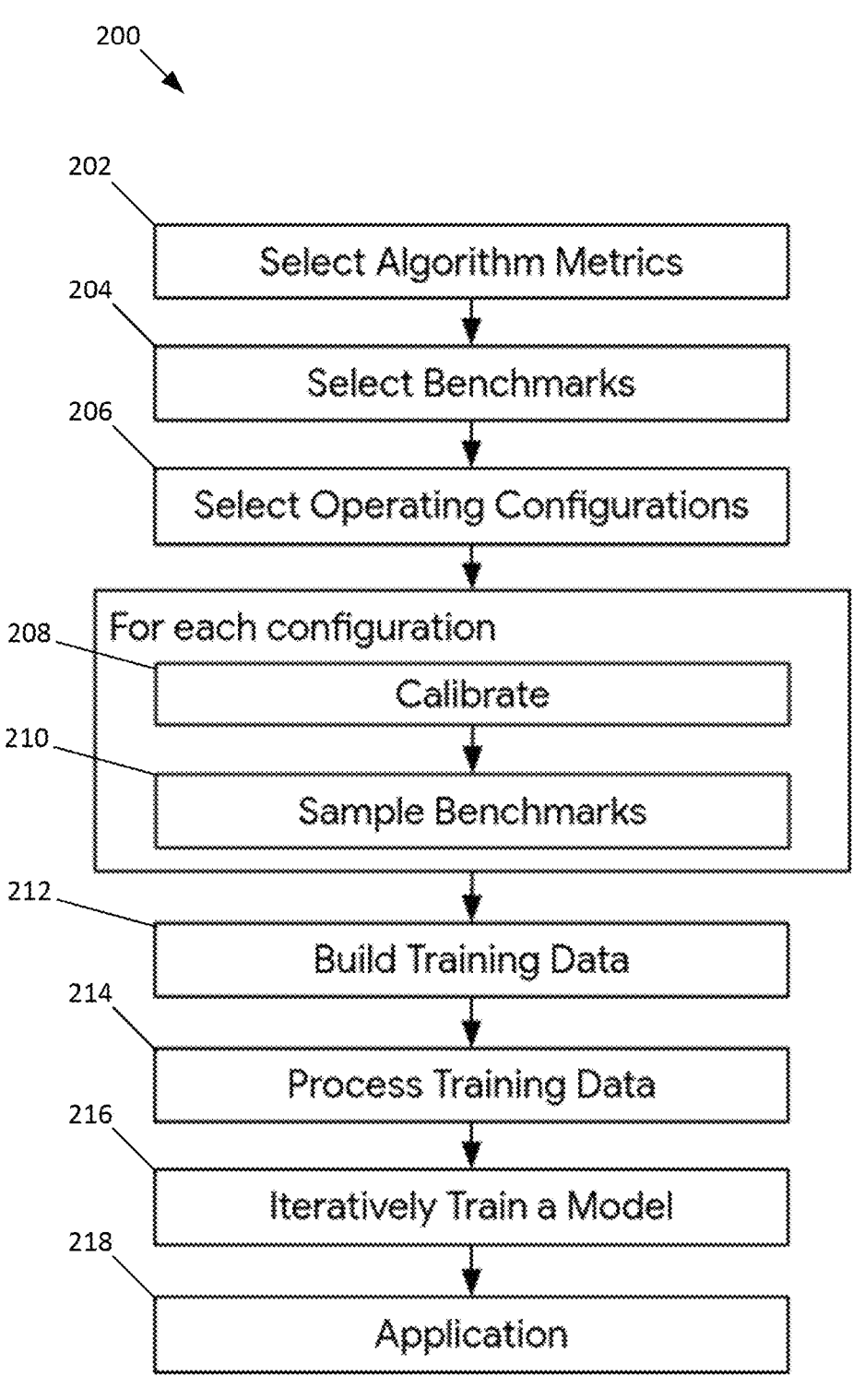
FIG. 2 depicts a flow diagram of an example method of training and applying an iteratively-trained model according to example embodiments of the present disclosure.

FIG. 2 depicts a flow diagram of an example method 200 for iterative supervised learning and application of quantum algorithm error models in a quantum computing system according to example embodiments of the present disclosure. The method 200 can be implemented using any suitable quantum computing system, such as the system described in FIG. 1. As used herein, the term "computing devices" can refer to a classical computing device, quantum computing device, or combination of classical and quantum computing devices. FIG. 2 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 202, the method 200 includes selecting one or more algorithm metrics. An algorithm metric is a "system-scale" error metric representative of an average performance of O(N) gates executing a quantum algorithm. Algorithm metrics can be represented by an array $A=(A_0, \ldots A_N)$, where each $A_i$ corresponds to samples associated with one distinct algorithm metric type. According to example aspects of the present disclosure, quantum algorithm metrics, including those that are computationally intractable to directly model, can be estimated from simpler qubit gate benchmark models. In some embodiments, algorithm metrics can be estimated from a model of benchmarks B, provided that they are taken in a representative context. Example algorithm metrics include average error of a processor-scale parallel XEB experiment; average error of a processor-scale random circuit; average logical error in a quantum error correction code, etc.

At 204, the method 200 includes selecting one or more benchmarks. A benchmark is an error metric representative of the average performance of O(1) gates. Benchmarks may be represented by the array B=(B$_0$, . . . B$_N$), where each B$_i$ corresponds to one benchmark type or samples associated with that benchmark type. Benchmarks serve as "targets" (also sometimes "labels") in the supervised-learning pipeline discussed in more detail below. Example benchmark types include: single-qubit randomized benchmarking (RB) error; single-qubit cross-entropy benchmarking (XEB) error; two-qubit RB error; two-qubit XEB error; and two-qubit XEB purity error. Each benchmark type can be taken in a plurality of operating contexts, as determined by the operating parameters p. These operating contexts can be segregated into two categories depending on the active/ inactive state of gates surrounding the gates being benchmarked. The distinction between them can be blurred in some operating contexts. An isolated benchmark is a benchmark for some gates G taken with surrounding qubits inactive. An isolated benchmark can help isolate, for instance, relaxation, or dephasing. A parallel benchmark is a benchmark for some gates G taken with surrounding qubits active. For example, a parallel benchmark can help emulate crosstalk errors in a quantum algorithm. Benchmarks can be sampled to produce a sample, or measurement, of the benchmark. Each sample can correspond to a tuple of gates G, operating parameters p, and calibration data D.

Based at least in part on the quantum algorithm and/or algorithm metrics of interest, benchmarks B can be selected that are useful in training models to predict metrics associated with the quantum algorithm. Benchmarks B that progress in modeling complexity, often leading to a natural progression from isolated benchmarks to parallel benchmarks, can be useful in many cases. Isolated benchmarks can be chosen to isolate error mechanisms, such as relaxation, dephasing, or crosstalk errors, such as error mechanisms on few gates operating simultaneously. Parallel benchmarks can be chosen to surface system-scale error mechanisms, such as, for example, crosstalk due to nearby gates operating simultaneously, in a way that mirrors the quantum algorithm of interest.

As one example, cross-entropy benchmarking (XEB) can be used as a benchmark. Cross-entropy benchmarking can be useful in, for example, modeling a processor-scale random circuit. As one example, cross-entropy benchmarking can measure 1Q and 2Q gate errors averaged over computational states and gates. Additionally and/or alternatively, cross-entropy benchmarking can be sampled in a variety of operating contexts to selectively isolate and/or surface various error mechanisms. Example cross-entropy benchmarks include, but are not limited to, an Isolated 1Q XEB (cross-entropy benchmarking on a 1Q gate Gi with other gates inactive), Isolated 2Q XEB (cross-entropy benchmarking on a 2Q gate G$_{ij}$ and 1Q gates G$_i$ and G$_j$, with other gates inactive), Parallel 1Q XEB (cross-entropy benchmarking on all 1Q gates simultaneously, where 1Q gate patterns are selected to mirror the quantum algorithm of interest), and/or Parallel 2Q XEB (cross-entropy benchmarking on all 2Q and 1Q gates simultaneously, where 2Q gate patterns are selected to mirror the quantum algorithm of interest and 2Q and 1Q gates alternate in time). For the purposes of brevity herein, Isolated 2Q XEB and/or Parallel 2Q XEB may be indexed by G$_{ij}$ only, with G$_i$ and G$_j$ implicit.

Figure 3:
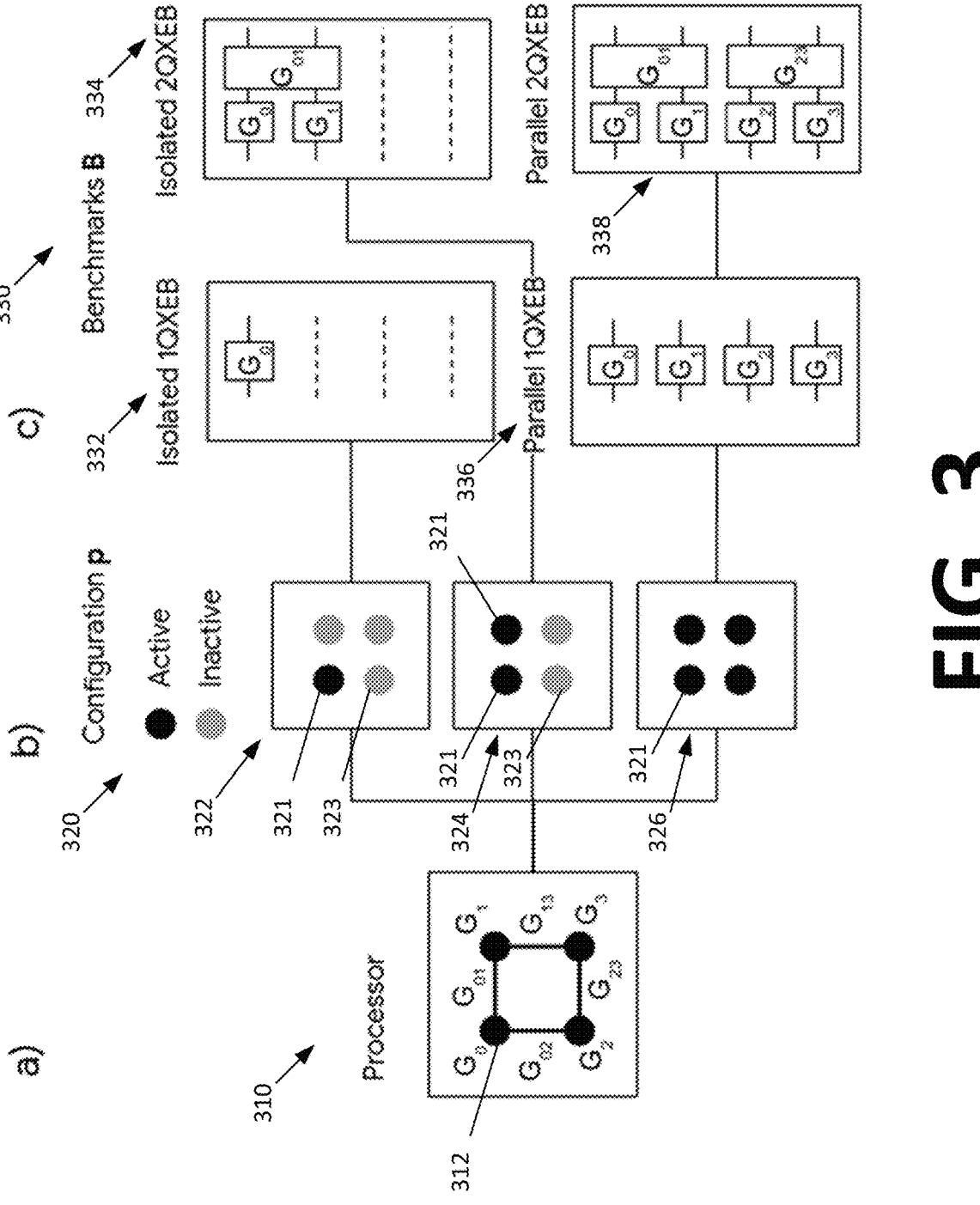
FIG. 3 depicts a block diagram of an example quantum processor configured in an operating parameter configuration by cross-entropy benchmarking according to example embodiments of the present disclosure.

For instance, FIG. 3 depicts a block diagram of an example quantum processor configured in an operating parameter configuration by cross-entropy benchmarking according to example embodiments of the present disclosure. The example processor 310 of FIG. 3 can include four qubits 312. Configurations 320 depict possible configurations of operating parameters for processor 310, having different arrangements of active qubits 321 and inactive qubits 323. For instance, first configuration 322 includes one active qubit 321 and three inactive qubits 323. Second configuration 324 includes two active qubits 321 and two inactive qubits 323. Finally, configuration 326 includes only active qubits 321. Benchmarks 330 depict time slices of quantum circuits corresponding to cross-entropy benchmarking experiments that can be sampled from the configurations 320. Dashed lines represent inactive qubits. For instance, benchmarks 330 include Isolated 1Q XEB 332, Isolated 2Q XEB 334, Parallel 1Q XEB 336, and Parallel 2Q XEB 338.

Referring back to FIG. 2, the method 200 can include, at 206, selecting operating parameter configurations. An operating parameter is a quantum processor control parameter that can be varied (e.g., by a user or by instructions (e.g., software instructions)). Operating parameters are represented by an array p=(p$_0$, . . . p$_N$), where each p$_i$ corresponds to the value of one distinct operating parameter. Operating parameters can impact the performance of benchmarks and/or algorithm metrics. Various choices of p can render qubits active or inactive. Example operating parameter types for quantum processors with superconducting qubits include: single-qubit idle frequency; single-qubit gate frequency trajectory; two-qubit gate frequency trajectory; qubit readout frequency trajectory; qubit reset frequency trajectory; etc. One example software representation includes: p$_0$: Dictionary mapping gate G$_i$ to the respective qubit's single-qubit gate frequency; p$_1$: Dictionary mapping gate G$_{ij}$ to an array encoding the respective qubits' frequency trajectories used to execute a two-qubit gate; etc.

For each operating parameter configuration, the method 200 can include, at 208, calibrating the quantum gates G. For instance, calibration data is raw and/or analyzed calibration information and/or characterization information and/or metadata. Calibration data can be represented by an array D=(D$_0$, . . . D$_N$), where each D$_i$ corresponds to arbitrary data. Calibration data D in combination with a set of operating parameters p is used to compute error indicators for relevant gates G. Example datasets of calibration data for quantum processors with superconducting qubits include: maximum operating frequency; qubit frequency anharmonicity; qubit bias voltage to operating frequency; qubit/qubit coupling efficiency; Ramsey coherence time versus frequency; spin-echo coherence time versus frequency; CPMG dephasing time (Tφ) versus frequency; energy-relaxation time (T1) versus frequency; timestamp corresponding to when data was acquired, etc. One example software representation includes: D$_0$: Dictionary mapping qubit to Energy-relaxation time (T1) versus frequency; D$_1$: Dictionary mapping tuple (qubit i, qubit j) to coupling efficiency; etc. Calibrating the quantum gates G according to the operating parameter configuration can facilitate sampling benchmarks.

The method 200 can then include, for each operating parameter configuration, at 210, sampling one or more benchmarks. It can be beneficial in building a model with appropriate generalization capability to sample the benchmarks B over a rich set of operating parameter configurations p and/or corresponding error indicators ε. For instance, it can be desirable when the trained model is evaluated in the context of an application that the evaluation relies less on extrapolation, which is assumed to be less reliable, and more on interpolation, which is assumed to be more reliable. Sufficiently sampling benchmarks can be performed according to sampling criteria.

As one example, sampling criteria can include a sufficiently sized spread for each error indicator $\varepsilon_i$. As one example, the spread sampled for each indicator, defined as $\Delta\varepsilon_i = \max(\varepsilon_i) - \min(\varepsilon_i)$, can desirably exceed the uncertainty in that indicator $\sigma\varepsilon_i$. For instance, it can be desirable that the ratio of the spread to the uncertainty is significantly greater than one, or $\Delta\varepsilon_i/\sigma\varepsilon_i \gg 1$. Uncertainty can arise, for example, from drift and/or fit uncertainty.

As another example, sampling criteria can include sampling a sufficiently representative spread in each error indicator $\varepsilon_i$. For instance, the spread $\Delta\varepsilon_i$ can desirably span values that are reasonable during realistic quantum processing. If the spread $\Delta\varepsilon_i$ is too small, then the eventual trained model may be less likely to generalize well, because the generalization may rely more on extrapolation than interpolation.

As another example, sampling criteria can include sampling in a manner that does not confound error indicators. It is also possible to vary parameter configurations in a manner that varies many indicators simultaneously, potentially confounding their impact on error. As another example, sampling criteria can include sampling in a manner that does not falsely correlate error indicators. As one example, for techniques such as dephasing, where error increases as qubits are operated away from their maximum frequencies, and pulse-distortion, where error increases as qubit 2Q gate frequencies deviate further from their idle frequencies, if all 2Q gate benchmarks are sampled with qubits idling at maximum frequencies, it can be difficult or impossible to disentangle dephasing from pulse-distortion.

As another example, sampling criteria can include generating samples in reasonable time. For instance, some implementations may require that processors be recalibrated at new operating parameters before benchmarking. Because recalibration can happen on time frames of up to days, in some cases, parameters can desirably be chosen in a reasonable time.

Implementations according to aspects of the present disclosure can desirably meet as many of the above sampling criteria as plausible while also limiting the number of operating parameter configurations, corresponding calibrations, and, ultimately, runtime. Efficiency of a sampling scheme can additionally depend on an operator's understanding of how error indicators trend with respect to operating parameters. Example sampling schemes include focused sampling, random sampling, sweep sampling, and/or parallel sampling. It should be understood that any suitable sampling scheme(s), including combinations of these and/or other sampling schemes, can be used for generating training data in accordance with aspects of the present disclosure.

One example sampling scheme that can be employed according to example aspects of the present disclosure is focused sampling. Focused sampling can be amenable to situations where an operator of the quantum computing system understands how indicators trend with respect to operating parameters. For instance, in these and/or other situations, the operator may conduct focused sampling experiments that are designed to efficiently meet the sampling requirements. One example implementation described herein contemplates generating large and/or representative spreads in three exemplary error indicators of a frequency-tunable superconducting transmon qubit architecture. Those of ordinary skill in the art will readily understand that any suitable focused sampling techniques for meeting any suitable error indicators can be employed to sample the benchmarks according to example aspects of the present disclosure.

For instance, one example error indicator contemplated herein is energy relaxation error during 1Q gates. Example techniques for generating suitable spreads of benchmarks for energy relaxation error during 1Q gates include sampling gates with low and high background energy relaxation rates and/or sampling gates close to two-level-system defects (TLS) (e.g., where the relaxation rate is high) and/or far from TLS (e.g., where the relaxation rate is low). Another example error indicator is dephasing error during 1Q gates. An example technique for generating suitable spreads of benchmarks for dephasing error during 1Q gates includes sampling gates close to flux-insensitive points (e.g., where the dephasing rate is low) and/or far from the flux-insensitive points (e.g., where the dephasing rate is high). Another example error indicator is crosstalk between nearby 1Q/1Q gates. An example technique for generating suitable spreads of benchmarks for crosstalk between nearby 1Q/1Q gates is sampling gates near resonance (e.g., high crosstalk) and gates far from resonance (e.g., low crosstalk).

Figure 4:
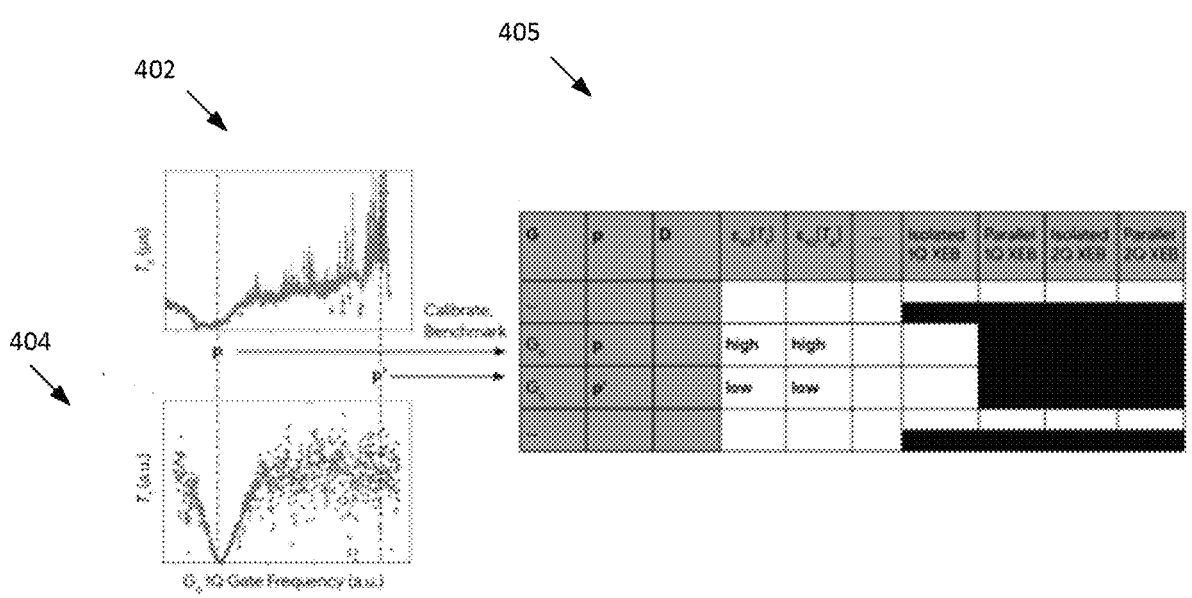
FIG. 4 depicts example sampling according to example embodiments of the present disclosure.

FIG. 4 depicts one particular example. Plot 402 depicts example decoherence spectrum for one qubit and corresponding 1Q gate frequency G0. Plot 404 depicts example energy-relaxation spectrum for the same qubit. To generate a large spread in the error indicator corresponding to relaxation, $G_0$ may be benchmarked with operating parameters p (high relaxation) and p' (low relaxation). Benchmarks taken at these configurations can occupy distinct rows of a training data table as shown in table 405. Some indicators, such as the one corresponding to dephasing may vary between p and p'. In an attempt to disentangle error indicators, it can be desirable to build sampling sequences, which occupy distinct blocks of training data, in which operating parameters are selected in a way that varies the fewest number of error indicators simultaneously.

Another example sampling technique is random sampling. Random sampling can be amenable to scenarios such as those where the quantum processor is not well understood. In random sampling, benchmarks can be sampled at random operating parameter configurations p. Such sampling may also be compatible with rapid data mining of available benchmarks, taken with arbitrary configurations p and for arbitrary purposes.

Another example sampling technique is sweep sampling. Sweep sampling can be amenable to scenarios such as those where the quantum processor is not well understood. Sweep sampling can include sampling benchmarks by sweeping one or few parameters in p. Such sampling may increase the calibration overhead necessary to compensate for the lack of physics knowledge embedded into the choice of p, but may reveal trends not captured by more sparse sampling strategies.

Yet another example sampling technique is parallel sampling, where sampling benchmarks is parallelized by some given parallelization. Examples of parallel sampling are depicted in FIGS. 4B and 4C. Rapidly sampling benchmarks for model training is desirable. Parallel sampling of isolatable or parallelizable benchmarks can provide for accurate and/or efficient sampling of benchmarks without compromising integrity of the model. Parallel benchmarks are parallelized by definition. Additionally and/or alternatively, isolated benchmarks can be parallelized by exploiting the spatial dependence and/or operating parameter dependence (for example, frequency-dependence) of some non-local effects, such as crosstalk.

Figures 5A, 5B:
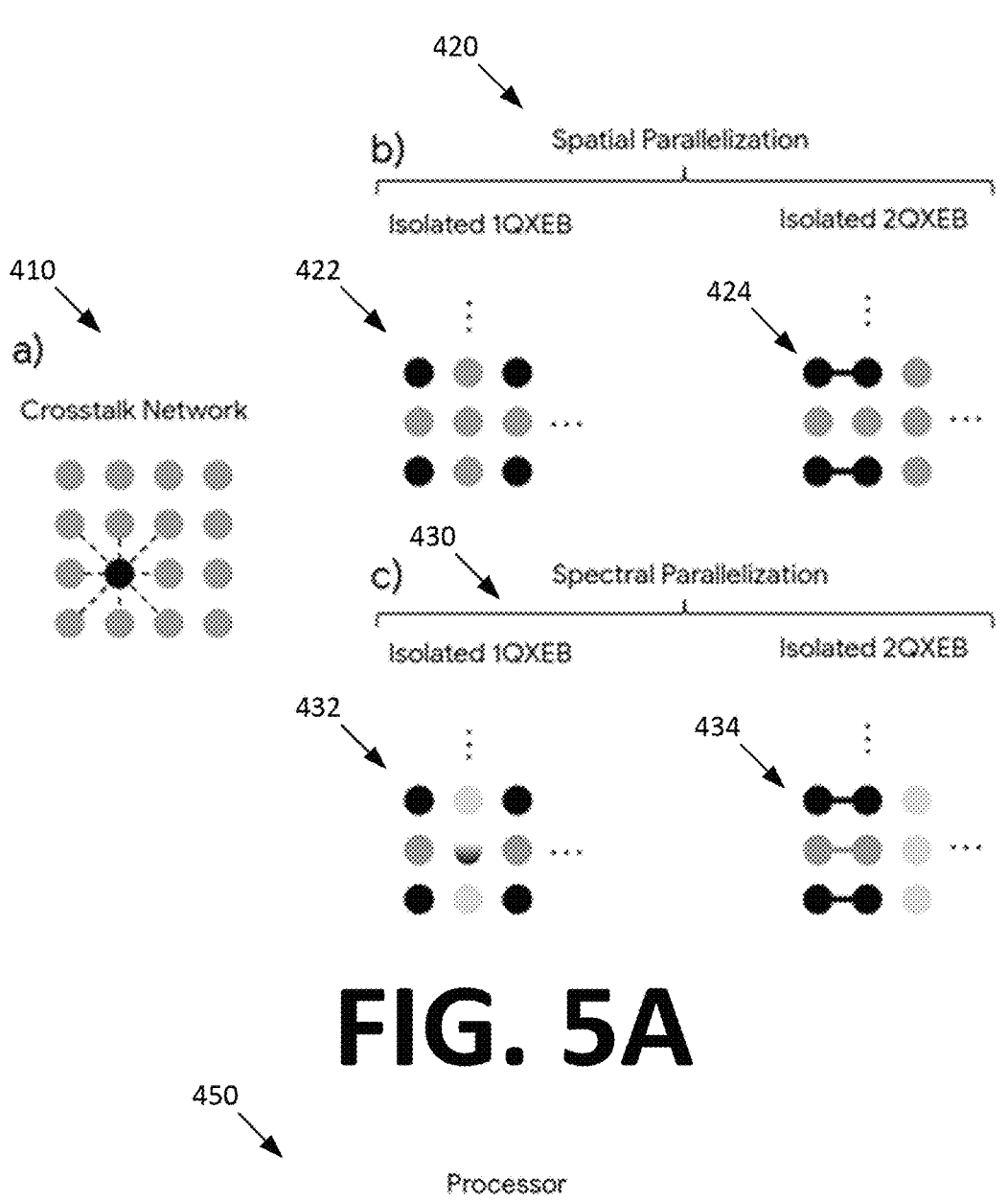
FIGS. 5A-5B depict example sampling according to example embodiments of the present disclosure.

For instance, FIG. 5A illustrates example crosstalk network 410. As shown, example crosstalk network 410 includes crosstalk between nearest-neighbor and next-nearest-neighbor qubits and respective gates. This locality can be utilized to accelerate isolated benchmarking via spatial and/or spectral parallelization. Additionally, FIG. 5A depicts example spatial parallelization 420. The spatial parallelization 420 is depicted for Isolated 1Q XEB 422 and Isolated 2Q XEB 424. Active qubits (shaded black in FIG. 5A) that are beyond the spatial extent of crosstalk can be considered isolated from one another, and therefore can be run in parallel without interference. Additionally, FIG. 5A depicts example spectral parallelization 430 for Isolated 1Q XEB and 432 and Isolated 2Q XEB 434. It is assumed that spectrally similar gates (e.g., 1Q gates and/or 2Q gates at or near the same operating frequency) may crosstalk. Active qubits that are within the spatial extent of crosstalk may nonetheless be considered isolated if their gates are sufficiently spectrally distinct, and therefore may be run in parallel without interference. Frequency distinctions are illustrated by shading, showing how gates with different frequencies may be considered isolated despite being within the spatial extent of crosstalk.

Isolated and/or parallel benchmarks can be further parallelized on different regions 452 of a processor 450, as illustrated in FIG. 5B. Each region 452 can sample distinct benchmarks in distinct operating parameter configurations. In some implementations, each region 452 can employ spatial and/or operating parameter parallelization as described with respect to FIG. 5A.

Figure 6:
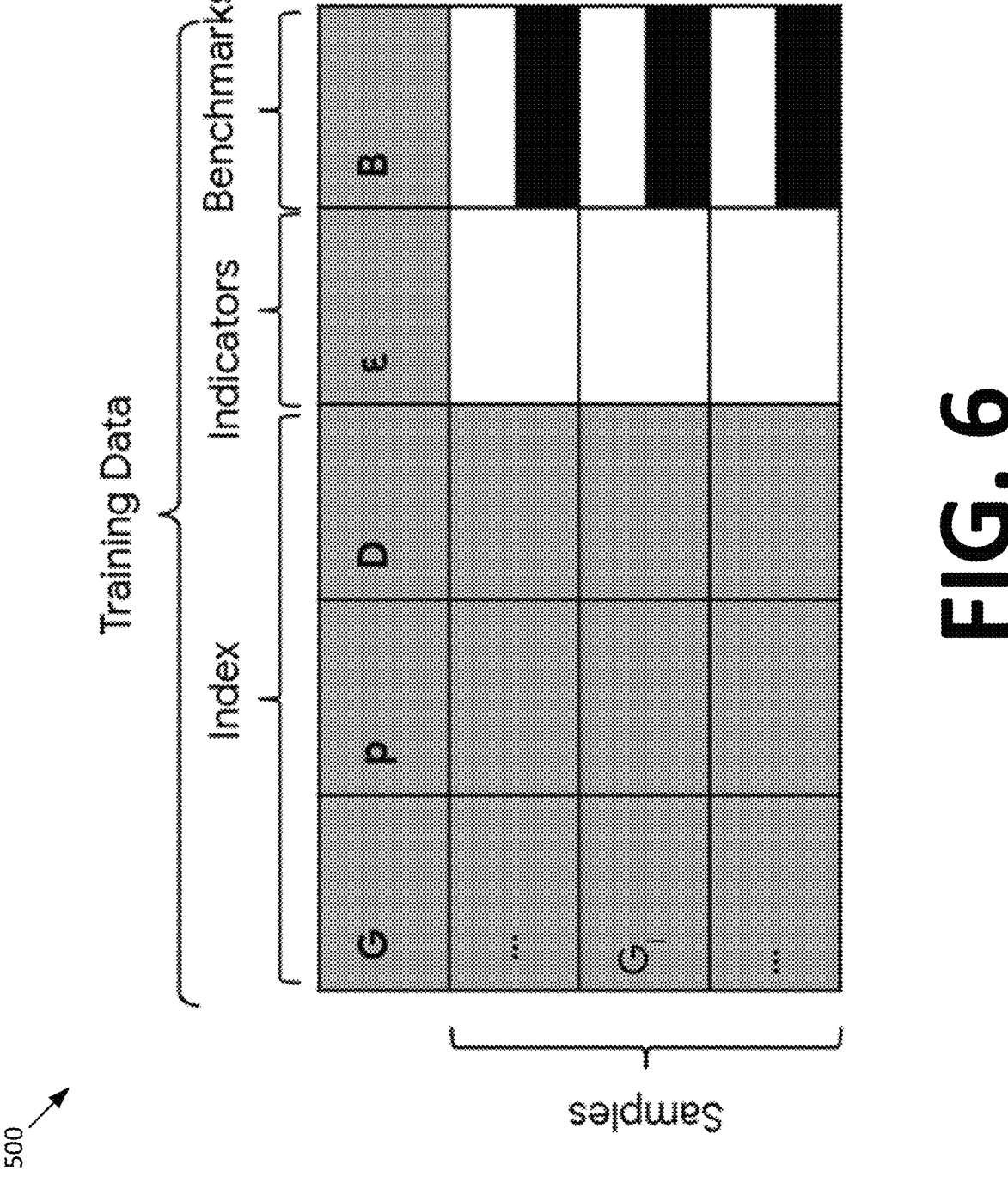
FIG. 6 depicts example training data according to example embodiments of the present disclosure.

Returning now to FIG. 2, the method 200 can include, at 212, building training data. Training data can be represented using any format. The training data can be or can include a training data table, such as the training data table 500 of FIG. 6 and/or training data table 700 of FIG. 8. For instance, a table can provide for consistently packaging and training on samples from a wide array of benchmark experiments. Referring now to table 500 of FIG. 6 by way of explanation, table 500 can be indexed with reference to benchmarked gates G. Additionally and/or alternatively, the table can be indexed by operating parameters p at which the gates G were benchmarked. Additionally and/or alternatively, the table can be indexed by calibration data D corresponding to a state of the processor during benchmarks. When used as an index in the training data, "D" may also reference some unique identifier corresponding to the much larger calibration data "D." Columns of the table can be or can include error indicators e (e.g., training features). Rows of the table can each correspond to a respective sample. The error indicators e may or may not be "identically zero." As one example, an error indicator corresponding to crosstalk can be identically zero for an Isolated 1Q XEB when sampled with one active qubit. The benchmarks B (e.g., training targets) may or may not apply. For example, a Parallel 2Q XEB may not be sampled in a configuration with one active qubit, selected for Isolated 1Q XEB.

Figure 7:
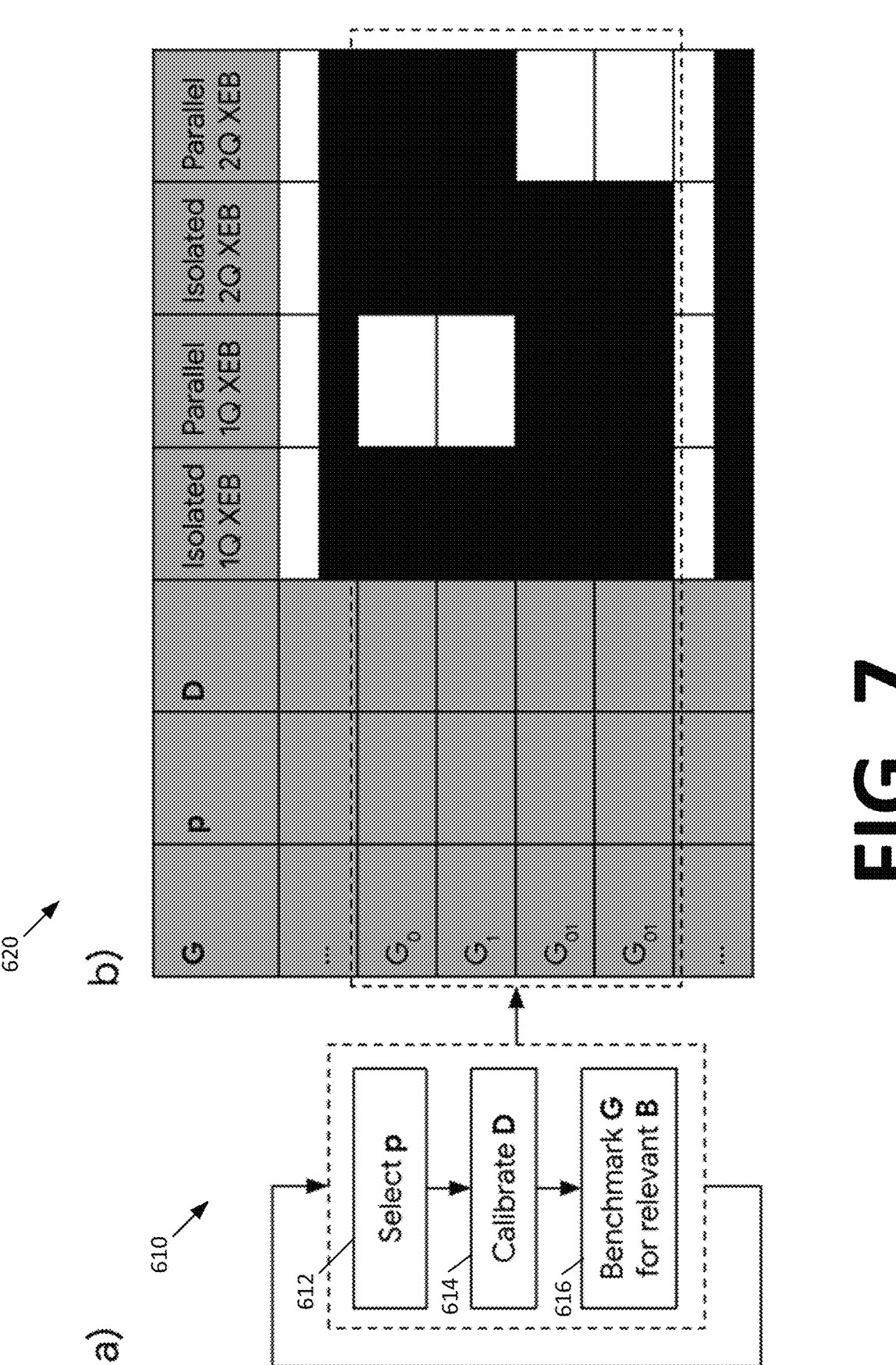
FIG. 7 depicts example sampling of training data according to example embodiments of the present disclosure.

For instance, one example process for building training data is depicted visually in FIG. 7. As illustrated, the process 610 can include selecting an operating parameter configuration p at 612, then calibrating the calibration data D at 614. The process 610 can then include benchmarking one or more gates G by sampling one or more benchmarks B, at 616. The samples can then be added as rows of training data table 620. For some configurations p, multiple benchmarks may be sampled. For example, Parallel 1QXEB and Parallel 2QXEB may be sampled in the same configuration. Error indicator columns are omitted from training data table 620 for the purposes of illustration.

The table of training data can be built from sampled benchmarks. For instance, benchmarks as described herein can be added to the training data table at respective indices of gates G, operating parameters p, and/or calibration data D. In some implementations, samples can be filtered to, for example, discard values that are anomalous (e.g., anomalously high or low), which may be indicative of a sampling error. Error indicators for each sample can be computed from the gates, operating parameters, and/or calibration data and added to the training data table. As one example, when predicting cross-entropy benchmarks, an example reduced set of high-level indicators can include: energy-relaxation error during 1Q gates $\varepsilon_{Gi}[T_1]$; dephasing error during 1Q gates $\varepsilon_{Gi}[T_\phi]$; energy-relaxation error during 2Q gates $\varepsilon_{Gij}[T_1]$; dephasing error during 2Q gates $\varepsilon_{Gij}[T_\phi]$; crosstalk between nearby 1Q/1Q gates $\varepsilon_{Gi/Gj}[\Delta]$; crosstalk between nearby 2Q/2Q gates $\varepsilon_{Gij/Gkl}[\Delta]$.

A specific definition is applied for these indicators depending on benchmark type. For instance, for 2Q benchmarks (e.g., for Isolated 2Q XEB or Parallel 2Q XEB), the 1Q indicators are taken to sum the participating qubit indicators (e.g., for G01, the indicator $\varepsilon_{Gi}[T_1]=\varepsilon_{G0}[T_1]+\varepsilon_{G1}[T_1]$). For relevant benchmarks, 1Q/1Q crosstalk on Gi is taken to be $\varepsilon_{Gi/Gj}[\Delta]=\Sigma_j\varepsilon_{Gi/Gj}[\Delta]$, where Gj are all 1Q gates that crosstalk with Gi. For relevant benchmarks, 2Q/2Q crosstalk on $G_{ij}$ is taken to be $\varepsilon_{Gij/Gkl}[\Delta]=\Sigma_{kl}\varepsilon_{Gij/Gkl}[\Delta]$ where Gkl are 2Q gates that crosstalk with Gij. This definition constrains the trainable parameters corresponding to each indicator to be identical for all applicable gates.

This constraint can lead to models with good predictive performance, especially when design variations, fabrication variations, control variations, and/or other significant variations between qubits and respective gates are kept small. Additionally and/or alternatively, employing this constraint in a linear model can lead to a manageable model capacity O(k), where k is a number of indicators. If, however, these variations are large, it can be desirable to resolve indicators by gate to train models with good predictive performance. For instance, the single indicator $\varepsilon_{Gi}[T_1]$ and respective column may be expanded into multiple error indicators $\varepsilon_{G0}[T_1], \ldots, \varepsilon_{GN}[T_1]$ and respective columns for each gate. Employing this strategy in a linear model may lead to a less manageable model capacity O(N), where N is the number of qubits in the processor. Furthermore, this strategy may increase the amount of data needed to train w and may generally be more susceptible to overfitting. Nonetheless, this strategy may be desirable in some implementations, such as for contemporary near-therm flagship processors.

Figure 8:
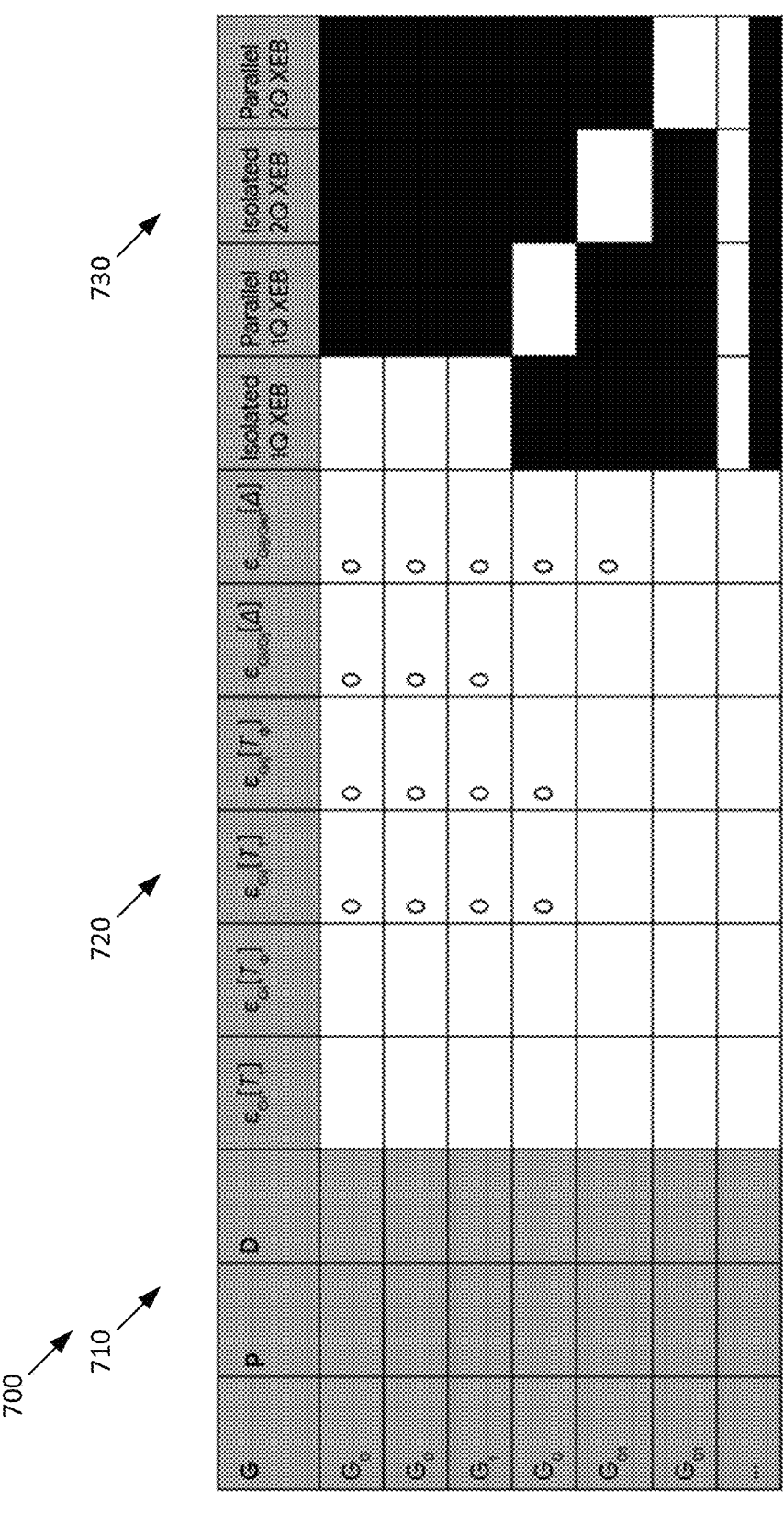
FIG. 8 depicts example training data according to example embodiments of the present disclosure.

For instance, training data table 700 of FIG. 8 depicts example training data packaged according to example aspects of the present disclosure. For instance, training data table 700 includes index columns 710, error indicator columns 720 corresponding to example error indicators described herein, and benchmark columns 730. Gates G can be calibrated in distinct operating parameter configurations p. The configurations p may be amenable to distinct benchmark types B. For the purposes of brevity, 2Q XEB benchmarks are indexed by their respective 2Q gate $G_{ij}$ (e.g., without including the respective 1Q gates $G_i$ and $G_j$, which are assumed implicit). Depending on the configuration and benchmark type, gates may or may not be susceptible to distinct errors E. As one example, crosstalk indicators can be identically zero for Isolated 1Q XEB. As another example, only 1Q/1Q crosstalk errors may be not identically zero for Parallel 1Q XEB and Isolated 2Q XEB.

Referring back to FIG. 2, the method 200 can include, at 214, processing the training data. The training data can be processed to, for instance, remove redundancies, inefficiencies, and/or inaccuracies in the training data. In some cases, for example, a well-performing error model can be developed without utilizing every error indicator. For instance, some error indicators may be more or less predictive and/or redundant. According to example aspects of the present disclosure, a correlation matrix of the training data can be computed to identify error indicators that are likely to be most predictive, least predictive, and/or redundant.

Figure 9:
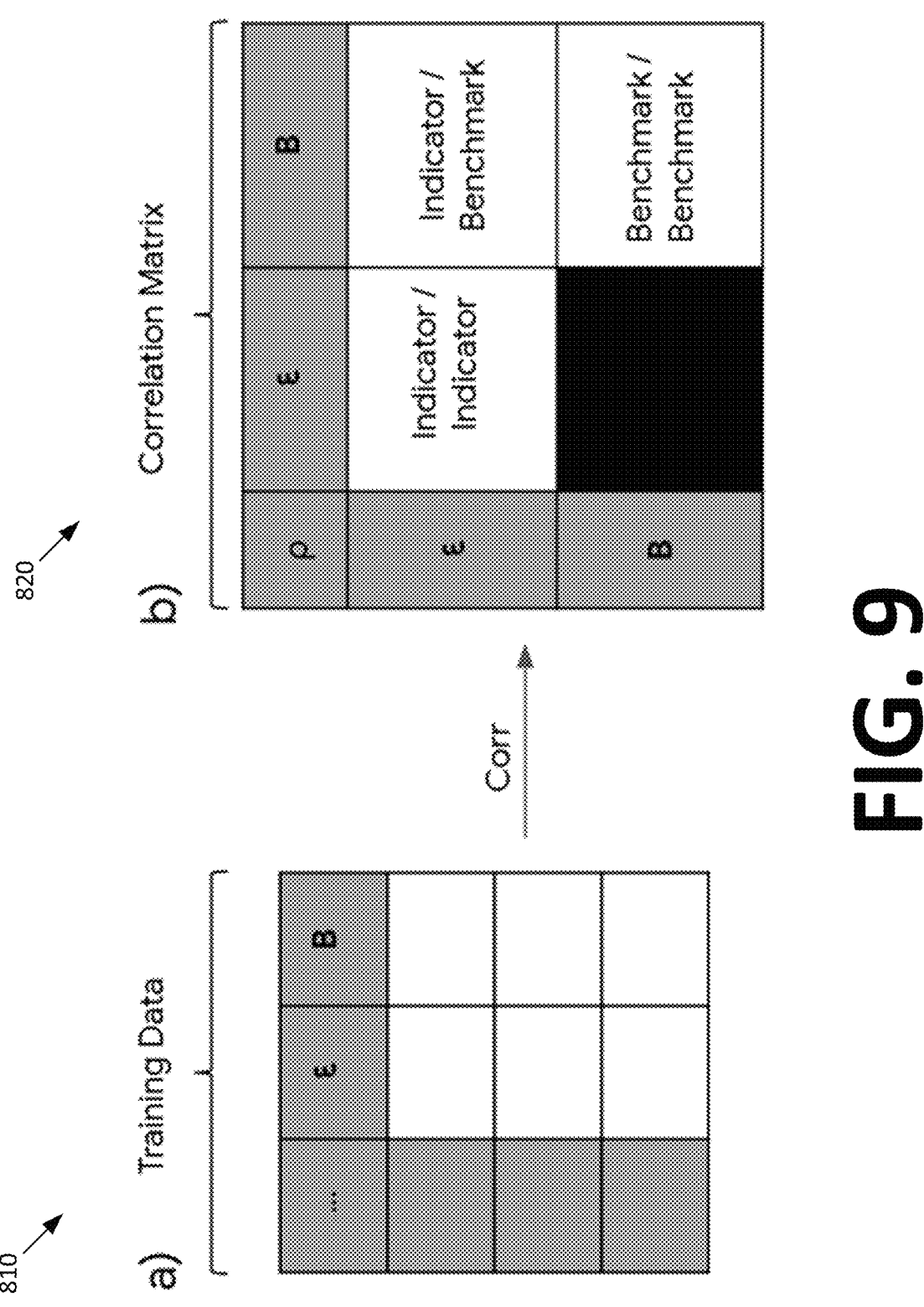
FIG. 9 depicts an example representation of training data and associated correlation matrix according to example embodiments of the present disclosure.

As one illustrative example, FIG. 9 depicts a reduced representation of a training data table 810 and its corresponding correlation matrix 820. Training data table 810 can be, for example, training data table 500 of FIG. 5 and/or training data table 700 of FIG. 7, and/or any other suitable training data table. The correlation matrix 820 can represent presence of and/or degree of correlation between error indicators and/or benchmarks in training data table 810. As one example, for high-level indicators, indicators that are more strongly correlated with benchmarks are likely to be the most predictive, whereas indicators that are uncorrelated or have a low degree of correlation with benchmarks may be unnecessary for prediction. Information in the correlation matrix (and/or comparable data structures) can be used to refine indicators in the training data table 810 and/or improve the performance of the model. For instance, the correlation matrix 820 carries information that may be used to refine error indicators and eventually trained models.

In one example implementation, a correlation matrix 820 can be defined as a matrix of numerical or other relative values where each cell corresponds to correlation between a given row and column, where the row and column each reflect an indicator or benchmark. The value in the cell can represent a degree of correlation between the row and column.

Each element of the correlation matrix 820 carries information that can be used to refine indicators and/or trained models. The refinement process may depend on whether the eventual model will be physical or nonphysical. For instance, non-physical models can be relatively more amenable to creative feature engineering, dimensionality reduction procedures, etc., that may stretch physical assumptions. Example refinement techniques are discussed below for the purposes of illustration. These example techniques are provided for the purposes of illustration only, and are not meant to be exhaustive.

For instance, in some cases, indicators can be weakly correlated with benchmarks. One example refinement technique for indicators weakly correlated with benchmarks, which can be applied to physical and/or non-physical models, can include assessing if weakly correlated indicators are actually expected to predict over benchmarks and revising as necessary. Physics-based techniques, statistical model shrinkage and/or selection techniques such as regularization and/or k-fold cross-validation can be useful for this technique. Another example refinement technique for indicators weakly correlated with benchmarks, which can be especially amenable for physical models, is to keep all physically-motivated indicators, even those which are weakly correlated with all benchmarks, and boost correlation through additional data acquisition. This can be done by, for example, sampling more benchmarks at operating configurations that are expected to surface and/or amplify weakly correlated indicators. As another example, this can be done by sampling new benchmark types that are more sensitive to weakly correlated indicators. This can be beneficial for constructing an accurate error budget. Yet another example refinement technique for indicators weakly correlated with benchmarks, which can be especially amenable for non-physical models, can include discarding certain indicators, especially if constructing an accurate error budget is a lesser goal. For example, indicators transformed by a (e.g., non-physical) model into features that are more strongly correlated with indicators should not be discarded. If some indicators can be determined to not be useful or have relatively less use in predicting any benchmarks, they may be discarded. Using fewer indicators can reduce model capacity, reduce chance of overfitting, and/or result in a faster model.

Additionally and/or alternatively, some indicators can be strongly correlated with other indicators. One example refinement technique for indicators that are strongly correlated with other indicators, which can be amenable to both physical and/or non-physical models, can be the use of statistical techniques such as principal component analysis (PCA) for supplementing raw correlations, providing for a better understanding of the relationship between indicators. Another example refinement technique for indicators that are strongly correlated with other indicators, which can be especially amenable for physical models, is to keep all physically-motivated indicators, even those which are weakly correlated with all benchmarks, and constrain and/or decorrelate the parameters. This can be beneficial for constructing an accurate error budget. If indicators are expected to vary with operating configurations in similar or identical functional forms, it may be possible to constrain them based on physics knowledge, which may reduce the number of indicators and solve the correlation problem, and/or decorrelate them by introducing new operating parameter types (e.g. other than qubit operating frequencies for frequency-tunable superconducting qubits) and sampling more existing or new benchmarks. If, however, indicators are expected to be uncorrelated, the indicators can be decorrelated through additional data acquisition. This can be done by, for example, sampling more benchmarks at new operating configurations and/or sampling new benchmark types that are expected to have different sensitivities to the correlated indicators from other benchmark types. Yet another example approach for refining indicators strongly correlated with themselves, which can be especially amenable to non-physical models, is to constrain and/or discard indicators through PCA dimensionality reduction.

Referring back to FIG. 2, the method 200 can include, at 216, iteratively training a model (e.g., a benchmark model). A trainable model can be defined for producing a benchmark model. Defining trainable models generally requires expert knowledge of quantum processor architecture and quantum algorithm of interest. Models may depend on the types of indicators used and/or application for which they are being trained. Example models include linear models, nonlinear models such as, for example, neural network models, and/or quantum simulation models. Any suitable trainable model can be employed according to example aspects of the present disclosure.

Figure 10A:
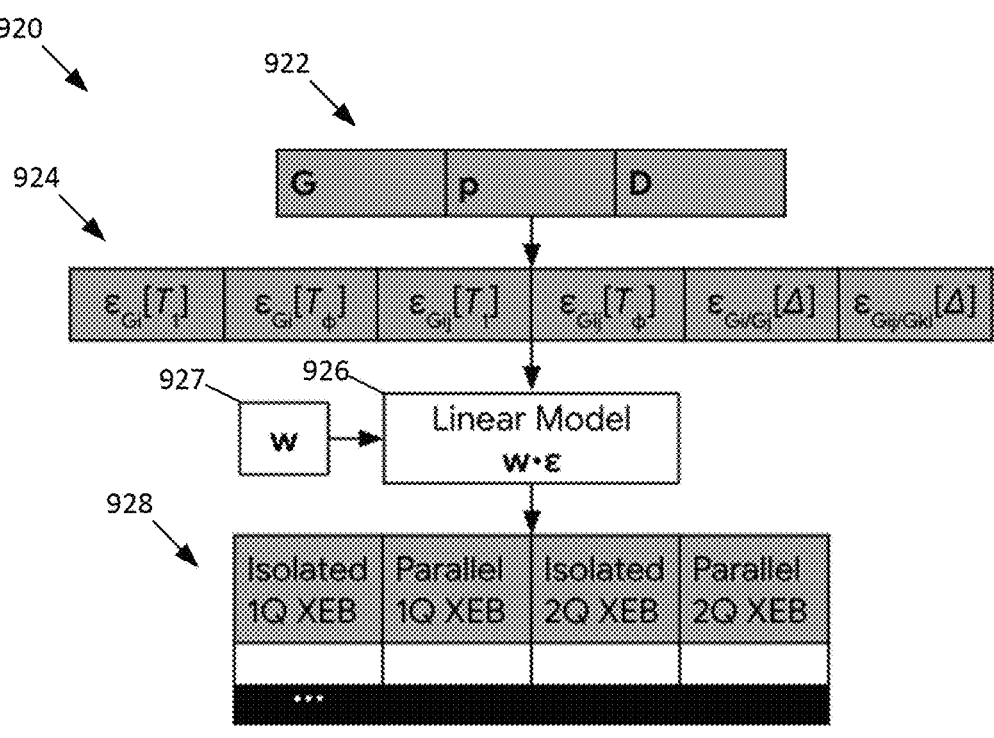
FIGS. 10A-10C depict block diagrams of example trainable models according to example embodiments of the present disclosure.
Figure 10B:
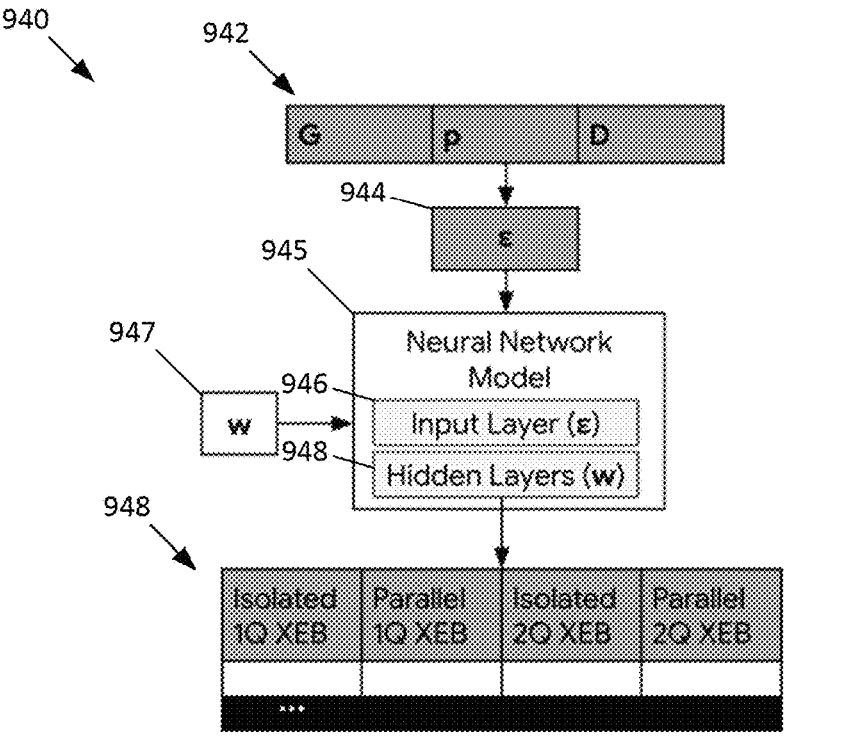
Figure 10C:
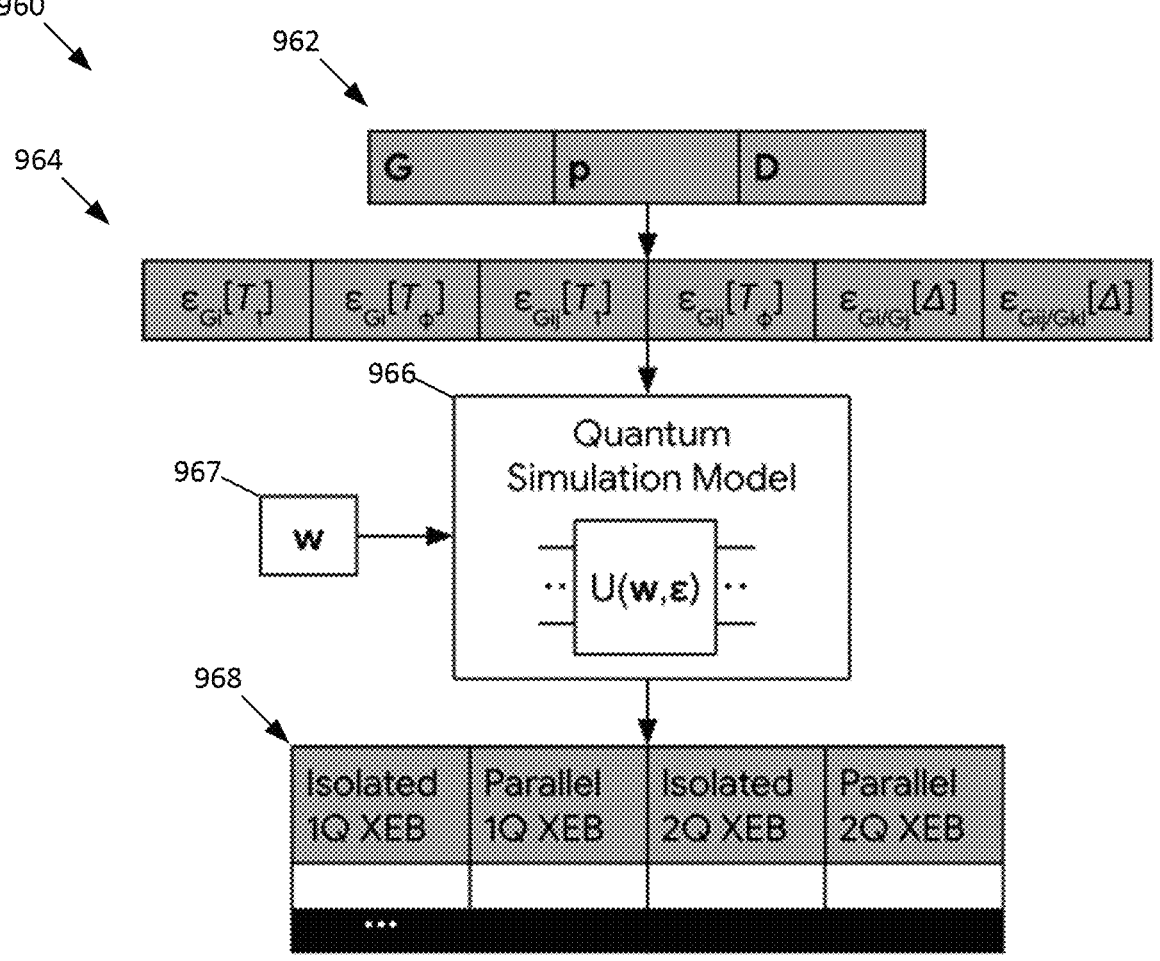

Example model types are discussed with reference to FIGS. 10A-10C. For instance, one example trainable model can include a linear model. FIG. 10A depicts an example trainable linear model 920 according to example aspects of the present disclosure. A model trainer can learn the coefficients of the trainable linear model 920 by training on error indicators with benchmarks as a training target. The trainable linear model 920 can be amenable for developing physical models over high-level indicators. Additionally and/or alternatively, the trainable linear model 920 can be amenable for cases where applications include developing an (e.g., physically-accurate) error budget, such as to inform processor research and development. The trainable linear model 920 can predict benchmarks by summing weighted error indicators.

The trainable linear model 920 can receive, as input data, training data including indices 922. The indices 922 can include gates G, operating parameter configurations p, and/or calibration data D. Additionally and/or alternatively, the trainable linear model 920 can receive, as input data, training data including one or more error indicators 924. Example error indicators 924 include, but are not limited to, energy-relaxation error during 1Q gates $\varepsilon_{Gi}[T_1]$; dephasing error during 1Q gates $\varepsilon_{Gi}[T_\phi]$; energy-relaxation error during 2Q gates $\varepsilon_{Gi}[T_1]$; dephasing error during 2Q gates $\varepsilon_{Gij}[T_\phi]$; crosstalk between nearby 1Q/1Q gates $\varepsilon_{Gi/Gj}[\Delta]$; and/or crosstalk between nearby 2Q/2Q gates $\varepsilon_{Gij/Gkl}[\Delta]$. The trainable linear model 920 can include a linear model 926 configured to receive the input data and, in response to receipt of input data, produce one or more benchmarks 928 as output. The linear model 926 can be defined by one or more trainable parameters w, 927. The trainable parameters 927 can be learned through iterative training to define a trained benchmark model according to example aspects of the present disclosure.

Another example trainable model includes a non-linear model. FIG. 9B depicts an example trainable nonlinear model 940 according to example aspects of the present disclosure. The example trainable nonlinear model 940 includes a neural network model 946, but it should be understood that any suitable nonlinear model can be employed according to example aspects of the present disclosure. A model trainer can learn coefficients and/or internal parameters of non-linear models over indicators. The trainable non-linear model 940 can be amenable for developing non-physical models over low-level indicators. Additionally and/or alternatively, the trainable non-linear model 940 can be amenable to developing physical models in certain implementations. As one example, the trainable non-linear model 940 can be useful for applications such as model calibration, where a physical error budget is not a requirement.

The trainable nonlinear model 940 can receive, as input data, training data including indices 942. The indices 942 can include gates G, operating parameter configurations p, and/or calibration data D. Additionally and/or alternatively, the trainable nonlinear model 940 can receive, as input data, training data including one or more error indicators 944. In some cases, high-level indicators can be more appropriate for linear models. Additionally and/or alternatively, there can be more flexibility in defining indicators for non-linear models.

The trainable nonlinear model 940 can include a nonlinear model such as, for example, a neural network model 945 configured to receive the input data and, in response to receipt of input data, produce one or more benchmarks 948 as output. The neural network model can be any suitable neural network model, such as neural network models including an input layer 946 and/or one or more hidden layers 947. Additionally, the neural network model 945 can be defined by one or more trainable parameters w, 943. The trainable parameters 943 can be learned through iterative training to define a trained benchmark model according to example aspects of the present disclosure. For instance, benchmarks can be predicted by feeding indicators into an input layer of the neural network model 945.

Yet another example trainable model includes a quantum simulation model. FIG. 10C depicts an example trainable quantum simulation model 960 according to example aspects of the present disclosure. A model trainer can learn the coefficients of indicators that are passed into some quantum simulator. Additionally and/or alternatively, a model trainer can learn parameters of the quantum simulator. The trainable quantum simulation model 960 can be amenable for developing physical models over high-level indicators. Additionally and/or alternatively, the trainable quantum simulation model 960 can be amenable for cases where applications include developing an (e.g., physically-accurate) error budget, such as to inform processor research and development. The trainable quantum simulation model 960 can predict benchmarks by running a quantum circuit simulation parameterized by error indicators and trainable parameters w.

The trainable quantum simulation model 960 can receive, as input data, training data including indices 962. The indices 962 can include gates G, operating parameter configurations p, and/or calibration data D. Additionally and/or alternatively, the trainable quantum simulation model 960 can receive, as input data, training data including one or more error indicators 964. Example error indicators 964 include, but are not limited to, energy-relaxation error during 1Q gates $\varepsilon_{Gi}[T_1]$; dephasing error during 1Q gates $\varepsilon_{Gi}[T_\phi]$; energy-relaxation error during 2Q gates $\varepsilon_{Gij}[T_1]$; dephasing error during 2Q gates $\varepsilon_{Gij}[T_\phi]$; crosstalk between nearby 1Q/1Q gates $\varepsilon_{Gi/Gj}[\Delta]$; and/or crosstalk between nearby 2Q/2Q gates $\varepsilon_{Gij/Gkl}[\Delta]$. The trainable quantum simulation model 960 can include a quantum simulation model 966 configured to receive the input data and, in response to receipt of input data, produce one or more benchmarks 968 as output. The quantum simulation model 966 can be defined by one or more trainable parameters w, 967. The trainable parameters 967 can be learned through iterative training to define a trained benchmark model according to example aspects of the present disclosure.

The trainable model can be trained based at least in part on a training cost function. The training cost function can provide a distance metric between the trainable model and benchmark samples (e.g., in the training data). One example training cost function is a least-squares L2 cost function. For instance, the least-squares L2 cost function can be defined as: Cost(w|G, p, D, B)=$\Sigma_{benchmarks}\Sigma_{samples}$[Model(w|G, p, D)−B]$^2$+L(w|G, p, D, B). The function L(w|G, p, D, B) may be an arbitrary regularization function that may be used to impose constraints on model parameters and/or downselect error indicators. Any suitable cost function can be used in accordance with the present disclosure.

Additionally and/or alternatively, the trainable model can be trained based at least in part on a training optimizer. The training optimizer can minimize the cost function with respect to the trainable parameters w to find some output (e.g., optimal or near-optimal) values of the trainable parameters w*. As an example, the training optimizer can solve the generic problem: w*=argmin$_w$Cost(w|G, p, D, B). One example training optimizer can be or can utilize gradient descent. Any suitable training optimizer can be used in accordance with the present disclosure. Hyperparameters, batch sizes, epochs, etc. can be determined based at least in part on training data, cost function, and/or other suitable parameters.

The benchmark model can be trained according to an iterative supervised-learning training procedure for training the model to predict benchmarks B, according to example aspects of the present disclosure. Generally, the model can be iteratively trained on samples corresponding to one or more judiciously-chosen benchmark types. Some implementations begin with benchmark types requiring the fewest indicators and corresponding model parameters to predict, then progress towards benchmark types requiring the most indicators and corresponding model parameters to predict. This progression can be in the direction from isolated to parallel benchmarks and/or fewer to more gates benchmarked simultaneously. However, any suitable progression, including deviations from those described herein, can be used in accordance with example aspects of the present disclosure. The trainable parameters are increasingly constrained by their values learned during previous iterations such that values of a subset of the trainable parameters are learned in each iteration until all values are known at the end of the final iteration.

For instance, one example method implementing this iterative training procedure includes selecting the training cost function, optimizer, and other relevant parameters. The method then includes defining a benchmark model Model $(w|G, p, D)$ for predicting (e.g., all) benchmark types B. In some implementations, the method includes sorting benchmarks $B_i$ in B, in order of increasing prediction complexity. Example definitions of prediction complexity include, but are not limited to: length $|w_i \equiv w[\ldots]|$ of the minimal subarray of w necessary to predict $B_i$; length $|\varepsilon_i \equiv \varepsilon[\ldots]|$ of the subarray of $\varepsilon$ that are not identically zero for $B_i$. The method can additionally include defining a number of training iterations N and/or which benchmark types $B_{iteration}$ from B to target during each iteration. Examples of benchmark targeting include, but are not limited to: $B_{iteration} = B[iteration]$; $B_{iteration} = B[0:iteration]$; $B_{iteration} = B[0:N]$ (non-iterative). For each iteration in $(0, \ldots, N)$, the method can include: sampling $(G, p, D)$ samples for $B_{iteration}$ and splitting the samples into testing, training, and/or validation sets; training the benchmark model Model $(w|G, p, D)$ on splits of $B_{iteration}$ to learn some parameters $w_{iteration}*$ (e.g., tuning hyperparameters, validating, and testing per standard protocols); and/or constraining $w_{iteration}$ for future iterations by trained parameters $w_{iteration}*$. In some implementations, constraining the parameters for future iterations can include a rigid constraint (e.g., rigidly fixing $w_{iteration}$ in w to $w_{iteration}*$) and/or a penalized constraint (e.g., penalizing $w_{iteration}$ in w for deviating from $w_{iteration}*$). After the final iteration, the method has produced the trained model Model $(G, p, D|w*)$. The trained parameters $w*$ are now fixed and the index $(G, p, D)$ is now variable, as in application usage. Examples of these techniques will be discussed in greater detail with reference to cross-entropy benchmark training. These techniques can be extended to other benchmarks and/or quantum algorithms according to example aspects of the present disclosure.

Figure 11:
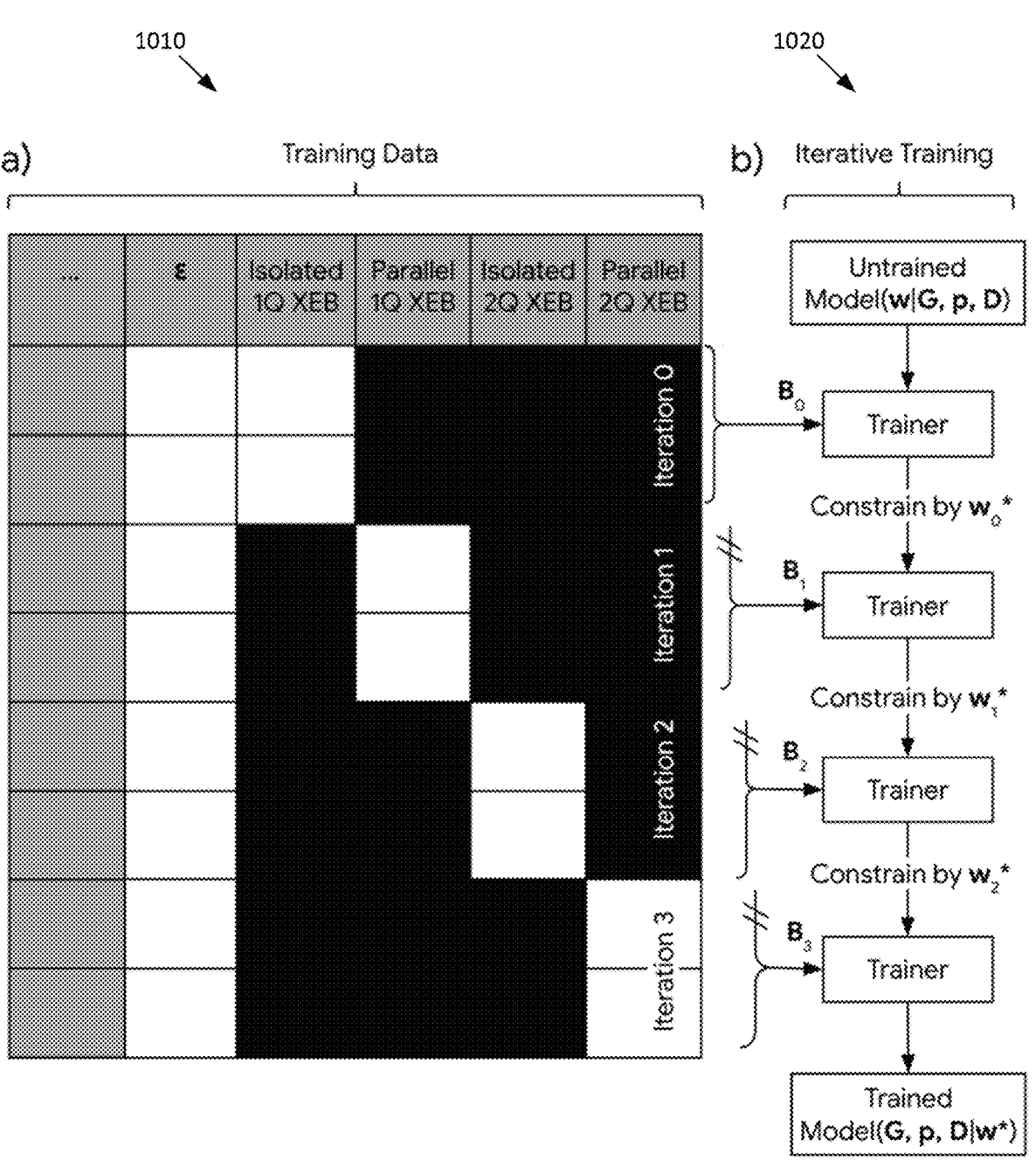
FIG. 11 depicts a flow diagram of example iterative training according to example embodiments of the present disclosure.

For instance, FIG. 11 depicts a diagram of an example iterative training process with respect to training data according to example embodiments of the present disclosure. FIG. 11 is illustrated with respect to training data 1010, which can be, for example, cross-entropy benchmarking (XEB) training data. In the example training data 1010, the benchmarks B are sorted from left to right in order of increasing prediction complexity. A model's parameters w are initialized and iteratively trained to predict benchmark types B. At each iteration, the trainer trains one or more parameters $w_i$ from w, targeting one or more benchmark types $B_i$. The trained parameters $w_i*$ at each step constrain the corresponding $w_i$ in future iterations. The progression can be from isolated to parallel benchmarks, such as from fewer to more relevant parameters $w_i$ to predict the respective $B_i$. As depicted in process 1020, a model's parameters are initialized as an untrained model Model $(w|G, p, D)$. In a first iteration, the model is trained on samples from a first benchmark $B_0$ to learn a first subset of the trainable parameters $w_0*$. The values of $w_0*$ are then constrained until the end of training. The model is then trained on a second benchmark $B_1$ to learn a second subset of the trainable parameters $w_1*$. The values of $w_1*$ are then constrained until the end of training. This is repeated through N iterations until the trainable parameters w are sufficiently learned to arrive at trained model Model $(G, p, D|w*)$.

Figure 12:
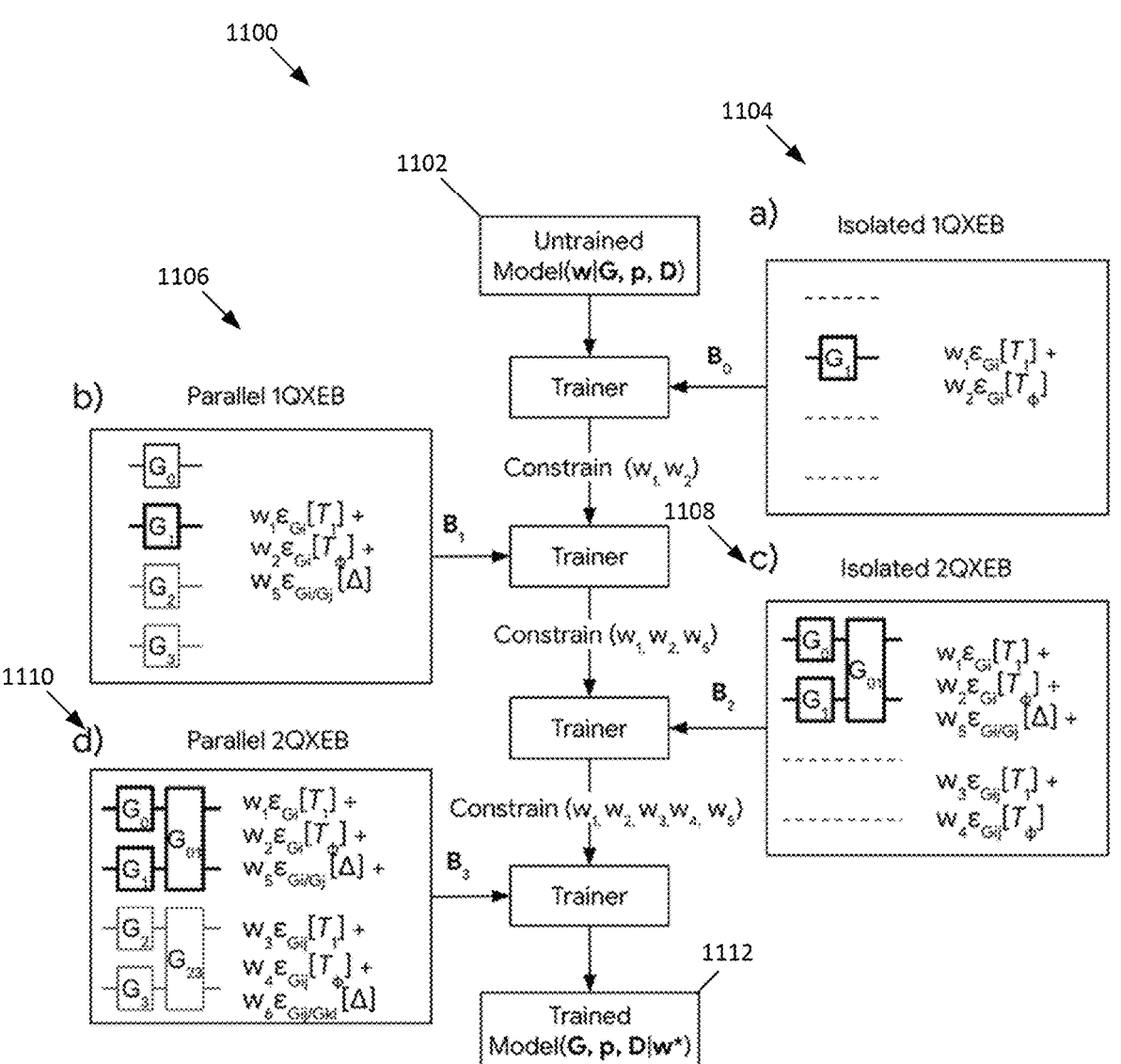
FIG. 12 depicts a flow diagram of example iterative training according to example embodiments of the present disclosure.

The iterative training process according to example aspects of the present disclosure will now be described in greater detail in one example implementation with respect to FIG. 12, in the context of XEB benchmark training. It should be understood that various examples and aspects described herein can be extended to other benchmarks and/or other quantum algorithms. FIG. 12 depicts a flow diagram of an example iterative training process 1100 according to example embodiments of the present disclosure. The example of FIG. 12 utilizes a linear model with an exemplary set of error indicators that is intended for the purposes of illustration only. Additionally, the notational dependence of error indicators s on $(G, p, D)$ is omitted for simplicity. Thus, in the example of FIG. 12, Model $(w|G, p, D) = w_1 \varepsilon_{Gi}[T_1] + w_2 \varepsilon_{Gi} + [T_\phi] + w_3 \varepsilon_{Gij}[T_1] + w_4 \varepsilon_{Gij}[T_\phi] + w_5 \varepsilon_{Gi/Gj}[\Delta] + w_6 \varepsilon_{Gij/Gkl}[\Delta]$. Furthermore, the example of FIG. 12 is described assuming that the trainer targets one benchmark type per training iteration, in order of increasing complexity. Finally, 2Q/1Q crosstalk is omitted for simplicity. These assumptions are taken for the purposes of illustration only and are not intended to be limiting on any aspect of the present disclosure.

At 1102, a model's parameters are initialized as an untrained model Model $(w|G, p, D)$. Training on Isolated 1Q XEB benchmark 1104 is then performed. This benchmark isolates 1Q relaxation and dephasing error, which correspond to $w_1$ and $w_2$. Since the indicators corresponding to all other parameters can be identically 0, this operation thus provides for training $w_1$ and $w_2$ in isolation. After this training operation, $w_1$ and $w_2$ are constrained (e.g. fixed) for future training operations.

Training on Parallel 1Q XEB benchmark 1106 is then performed. Compared to Isolated 1Q XEB benchmark 1104, this benchmark is additionally sensitive to crosstalk between 1Q gates, which corresponds to $w_5$. Since $w_1$ and $w_2$ were constrained in the previous training round, and since the indicators corresponding to $w_3$ and $w_4$ can be identically 0, this operation provides for training $w_5$ in isolation. Once trained, $w_5$ is constrained by its trained value for future training operations.

Training on Isolated 2Q XEB benchmark 1108 is then performed. Compared to Parallel 1Q XEB benchmark 1106, this benchmark is additionally sensitive to 2Q relaxation and dephasing error, which correspond to $w_3$ and $w_4$. Since $w_1$, $w_2$, and $w_5$ were constrained in previous training rounds and since the indicator corresponding to $w_6$ can be identically 0, $w_3$ and $w_4$ can be trained in isolation. After this training operation, $w_3$ and $w_4$ are constrained (e.g. fixed) for future training operations.

Finally, training on Parallel 2Q XEB benchmark 1110 is performed. Compared to Isolated 2Q XEB benchmark 1108, this benchmark is additionally sensitive to crosstalk between 2Q gates, which corresponds to $w_6$. Since all other parameters have been trained and fixed, $w_6$ can now be trained in isolation. Once trained, $w_5$ is constrained by its trained value. After these iterations, at 1112, all parameters w are trained and denoted w*. The correspondingly trained XEB model is Model(G, p, D|w*).

In some implementations, particularly if system-scale effects are believed to have non-trivial impact on various elements of w, the training procedure can be modified in various ways to correct the system-scale effects. As one example, the training procedure can be modified such that multiple benchmark types are included at each training iteration. As one example, Isolated and Parallel 1Q XEB samples can be included during the Isolated 2Q XEB iteration. As another example, after iterative training, w can be retrained on all benchmark types B simultaneously, while constraining the parameters to previously trained parameter w* values with arbitrary strength.

Additionally and/or alternatively, in some implementations, the trainable model can be trained based at least in part on a non-iterative training process. For instance, a benchmark model can be trained that is extensible to some algorithm metrics on samples from a single benchmark type. The benchmark should capture all distinct gate types in the quantum algorithm of interest and should be operable in a way that is representative of the algorithm. As examples, Parallel 1Q XEB may be insufficient to predict algorithm metrics associated with 2Q gates, which it does not benchmark, and/or Parallel 2Q XEB may be insufficient because crosstalk may not be representative of the algorithm of interest, despite benchmarking both 1Q and 2Q gates. One concern with this method is that all coefficients are trained simultaneously. Since some error mechanisms may trade off against one another in complex ways, this method may not be conducive to training a model that generalizes. The iterative training process described herein can help surmount these complications associated with non-iterative training.

Referring back to FIG. 2, the method 200 can include, at 218, applying the trained benchmark model to determine quantum algorithm metrics. For instance, the trained benchmark model can be used to produce a quantum algorithm metric model useful for predicting the performance of a quantum algorithm with given operating parameters. If algorithm metric samples are available at sufficiently many operating parameter configurations p, the iterative training process described above can be applied by treating algorithm metrics A as additional benchmark types B over all gates G. However, algorithm metrics can be prohibitively difficult to sample over sufficiently many parameter configurations to be useful in training, for example in cases where the complexity and/or runtime of calibrating O(N) gates and/or algorithm runtime is prohibitively expensive. Example aspects of the present disclosure provide for predicting an algorithm metric model from simpler (e.g., O(1)) qubit gate benchmark models. According to example aspects of the present disclosure, gates can be benchmarked in a context representative of the quantum algorithm of interest.

For instance, according to example aspects of the present disclosure, a trained benchmark model can be decomposed into one or more quantum gate models. In some implementation, the benchmark model can include algorithm-dependent components and/or algorithm-independent components that can be used in decomposition. The quantum gate models can be models of, for example, 1Q and/or 2Q gates, and/or any other suitable quantum gates. The quantum gate models can then be used to construct a quantum algorithm metric model.

Figure 13:
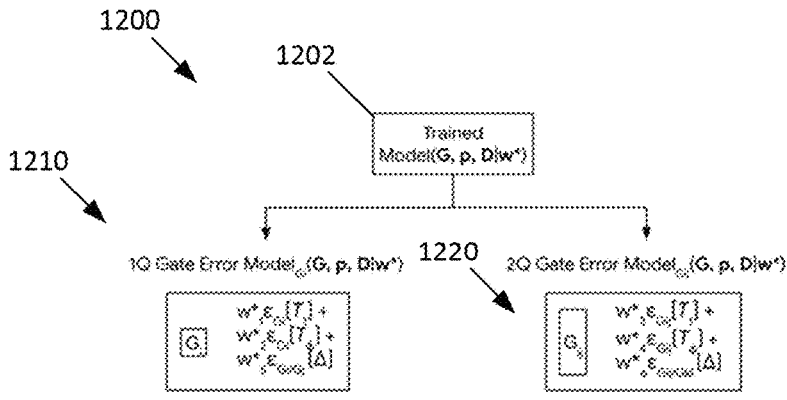
FIG. 13 depicts an example of decomposing an iteratively trained model into gate error models according to example embodiments of the present disclosure.

As one example, FIG. 13 depicts an example process 1200 of decomposing an iteratively trained model into gate error models according to example embodiments of the present disclosure. In particular, FIG. 13 describes an example strategy for predicting an expected error of a processor-scale random circuit using the XEB gate benchmark model Model(w*) described in the prior examples (e.g., trained model 1112 of FIG. 11). The trained model 1202 can be decomposed into a 1Q gate model 1210 and a 2Q gate model 1220. For example, models for 1Q and 2Q gates, $\text{Model}_{Gi}(G, p, D|w^*)$ and $\text{Model}_{Gij}(G, p, D|w^*)$, respectively, can be produced by decomposing Model(G, p, D|w*).

Figure 14:
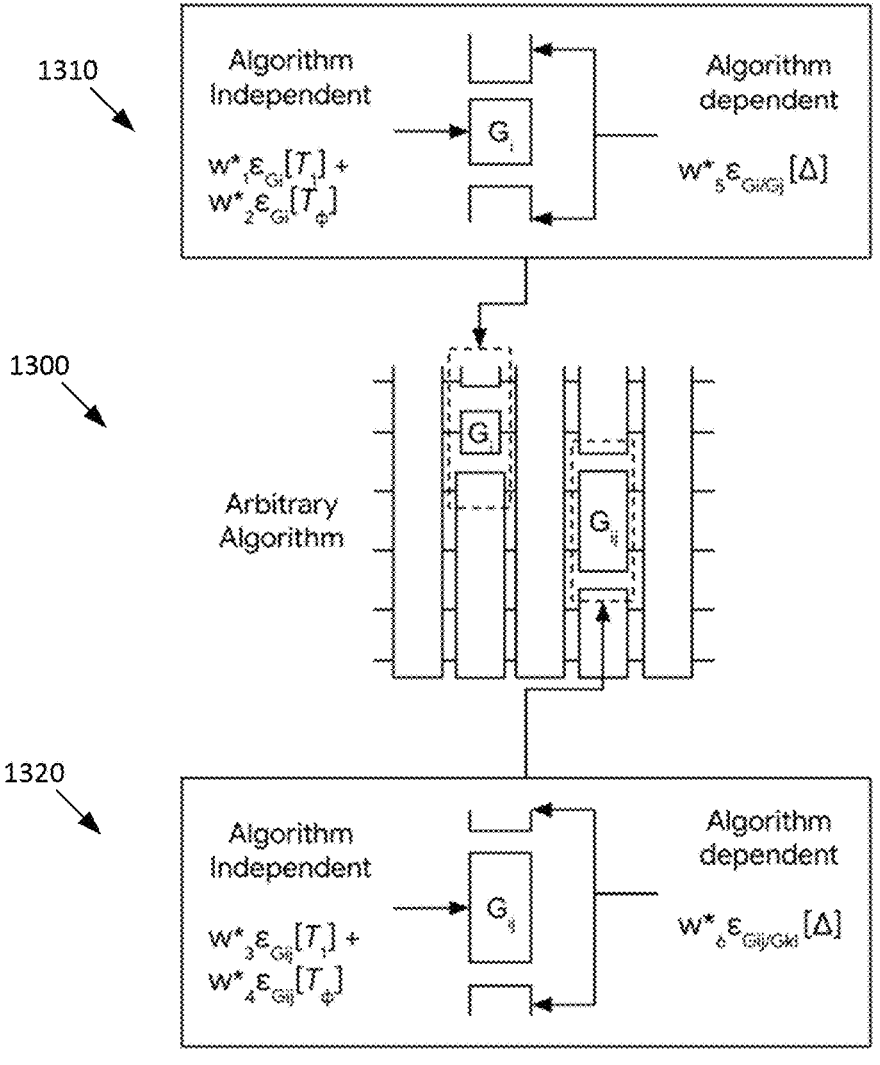
FIG. 14 depicts an example of estimating the expected error of a circuit according to example embodiments of the present disclosure.

FIG. 14 depicts an example algorithm model 1300 including algorithm independent components and algorithm dependent components according to example embodiments of the present disclosure. The gate models described herein can include algorithm independent components, such as relaxation and dephasing, and/or algorithm dependent components, such as crosstalk. Example 1Q and 2Q gate models include: $\text{Model}_{Gi}(G, p, D|w^*)=w_1^*\varepsilon_{Gi}[T_1]+w_2^*\varepsilon_{Gi}[T_\phi]+w_5^*\varepsilon_{Gi/Gj}[\Delta]$; $\text{Model}_{Gij}(G, p, D|w^*)=w_3^*\varepsilon_{Gij}[T_1]+w_4^*\varepsilon_{Gij}[T_\phi]w_6^*\varepsilon_{Gij/Gkl}[\Delta]$. To estimate the expected error of a processor-scale random circuit, the models for all constituent gates can be summed. For an accurate estimate of the error, it can be beneficial to sum crosstalk contributions in a way that mirrors the random circuit, such as by Model(G, p, D|w*)=$\Sigma_{Gi}\text{Model}_{Gi}(G, p, D|w^*)+\Sigma_{Gij}\text{Model}_{Gij}(G, p, D|w^*)$. As one example, first gate algorithm 1310 and second gate algorithm 1320 can each include algorithm dependent and algorithm independent components which, in combination, compose algorithm model 1300.

Figure 15:
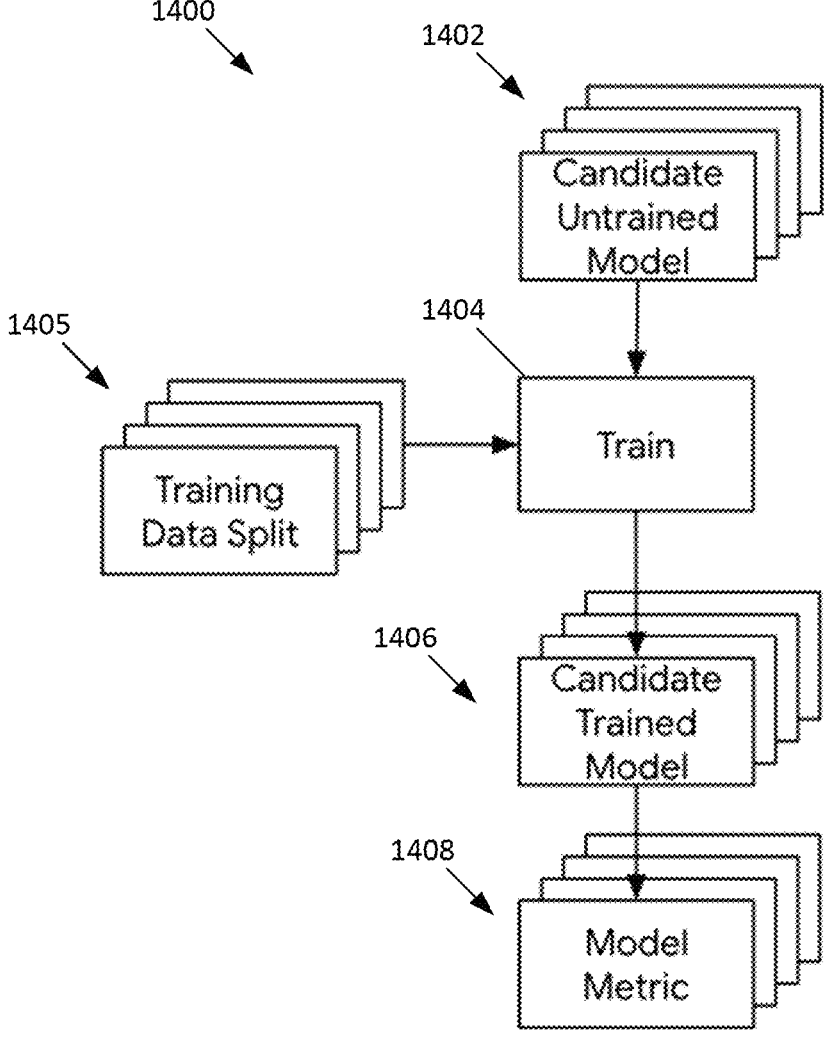
FIG. 15 depicts an example model selection workflow according to example embodiments of the present disclosure.

FIG. 15 depicts an example model selection workflow 1400 according to example embodiments of the present disclosure. In some cases, at the start of a training procedure, desirable model type of the trainable model, such as linear model vs. non-linear model, and/or types of error indicators (e.g., for predictability and/or generalization) may not be explicitly known. Thus, some implementations according to example aspects of the present disclosure can include selecting a trainable model from a plurality of candidate trainable models. Additionally and/or alternatively, some implementations can include selecting the one or more error indicators from a plurality of candidate error indicators. One example framework for selecting the trainable model and/or indicators is k-fold cross validation, where multiple candidate models and/or combinations of error indicators are trained on multiple testing/training/validation training data splits. The model ultimately having the highest performance is selected as the trained benchmark model. Model performance can be evaluated in any suitable method, such as correlation between predicted and measured benchmarks and/or model complexity.

For instance, in the example depicted in FIG. 15, multiple candidate untrained models 1402 are generated as described herein. At 1404, each of the candidate untrained models 1402 is trained on various splits of training data 1405 to produce candidate trained models 1406. For instance, a single batch of training data can be segmented or split into sets of testing data, training data, and/or validation data such that each model is trained on slightly different, but homogenous, training data. The candidate trained models 1406 are then evaluated against each other with respect to a given model metric 1408. One example model metric 1408 is correlation between measured and predicted benchmarks. The highest performing candidate trained model 1406 with the lowest complexity can then be selected as the trained model. The candidate untrained models 1402 can vary based on which error indicators are included in the model. Additionally and/or alternatively, the candidate untrained models 1402 can vary based on which model type (e.g., linear, nonlinear, quantum simulation, etc.) is used.

Figure 16A:
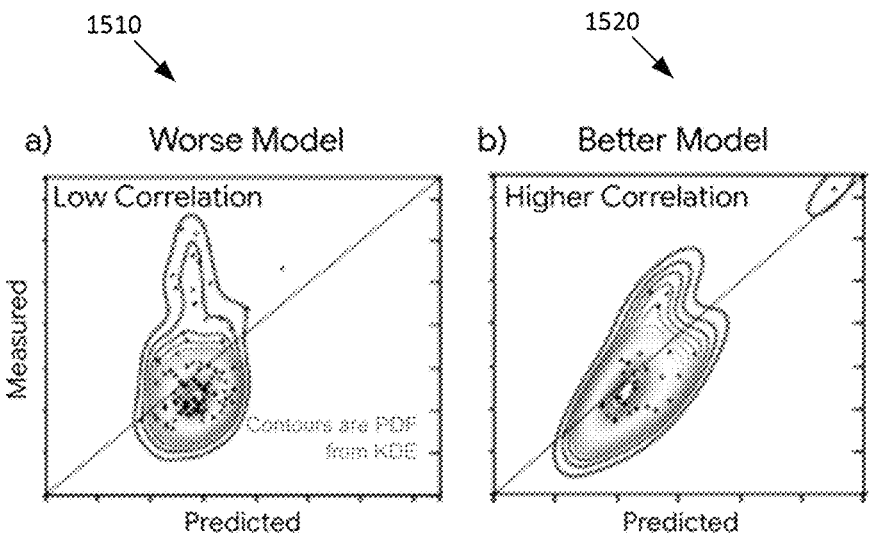
FIGS. 16A-16B depict an example model selection experiment according to example embodiments of the present disclosure.
Figure 16B:
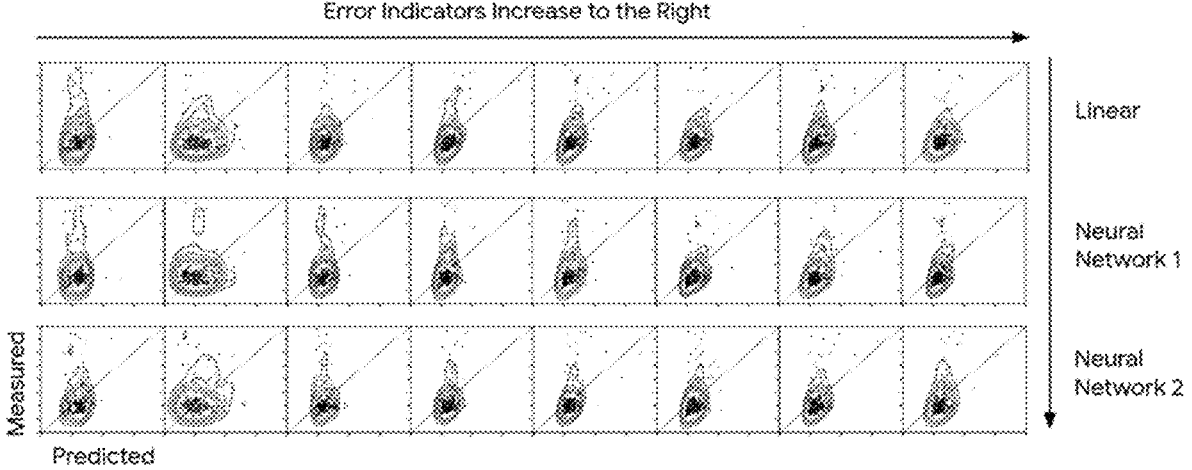

FIGS. 16A-B depict an example model selection experiment according to example embodiments of the present disclosure. For instance, FIG. 16A depicts a plot of the predicted and measured values of an Isolated 2Q XEB benchmark experiment for two models. Points are expected to fall onto the diagonal, where prediction matches measurement. This correlation is one of many possible model evaluation metrics. As illustrated in FIG. 16A, the model depicted in 1520 outperforms that depicted in 1510 because the correlation between predicted and measured values is greater. The contours are estimates of the underlying probability density, as computed via gaussian kernel density estimation. FIG. 16B depicts the results of performance of candidate models from several models of different types and number of error indicators, including linear models, a single-layer neural network, and a double-layer neural network. Neural network architecture complexity increases downwards, and number of input error indicators increases to the right. If the results depicted in FIG. 16B corresponded to a plurality of candidate trained models, for example, the highest-correlated model with the lowest complexity could be selected as the final trained model.

FIG. 17 depicts a flow diagram of an example method 1600 for generating a benchmark model for a quantum algorithm to be implemented in a quantum computing system having a quantum processor according to example embodiments of the present disclosure. The method 1600 can be implemented using any suitable quantum computing system, such as the system described in FIG. 1. As used herein, the term "computing devices" can refer to a classical computing device, quantum computing device, or combination of classical and quantum computing devices. FIG. 17 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 1602, the method 1600 includes obtaining (e.g. by one or more computing devices) data associated with a benchmark model. The benchmark model can include one or more error indicators as features, one or more benchmarks as targets, and/or one or more trainable parameters, wherein each error indicator is associated with a distinct quantum gate calibrated in a distinct operating configuration associated with a plurality of operating parameters for the quantum gate and associated with a calibration data for the operating configuration. A trainable model can be defined for producing a benchmark model. Defining trainable models generally requires expert knowledge of quantum processor architecture and quantum algorithm of interest. Models may depend on the types of indicators used and/or application for which they are being trained. Example models include linear models, nonlinear models such as, for example, neural network models, and/or quantum simulation models. Any suitable trainable model can be employed according to example aspects of the present disclosure. For instance, in some implementations, the one or more trainable parameters are associated with at least one of a linear model, a nonlinear model, or a quantum simulation model.

The trainable model can be trained based at least in part on a training cost function. The training cost function can provide a distance metric between the trainable model and benchmark samples (e.g., in the training data). One example training cost function is a least-squares L2 cost function. For instance, the least-squares L2 cost function can be defined as: $Cost(w|G, p, D, B)=\Sigma_{benchmarks}\Sigma_{samples}[Model(w|G, p, D)-B]^2+L(w|G, p, D, B)$. The function $L(w|G, p, D, B)$ may be an arbitrary regularization function that may be used to impose constraints on model parameters and/or downselect error indicators. Any suitable cost function can be used in accordance with the present disclosure. Additionally and/or alternatively, the trainable model can be trained based at least in part on a training optimizer. The training optimizer can minimize the cost function with respect to the trainable parameters $w$ to find some output (e.g., optimal or near-optimal) values of the trainable parameters $w^*$. As an example, the training optimizer can solve the generic problem: $w^*=argmin_w Cost(w|G, p, D, B)$. One example training optimizer can be or can utilize gradient descent. Any suitable training optimizer can be used in accordance with the present disclosure. Hyperparameters, batch sizes, epochs, etc. can be determined based at least in part on training data, cost function, and/or other suitable parameters.

The benchmark model can be trained according to an iterative supervised-learning training procedure for training the model to predict benchmarks B, according to example aspects of the present disclosure. Generally, the model can be iteratively trained on samples corresponding to one or more judiciously-chosen benchmark types. Some implementations begin with benchmark types requiring the fewest indicators and corresponding model parameters to predict, then progress towards benchmark types requiring the most indicators and corresponding model parameters to predict. This progression can be in the direction from isolated to parallel benchmarks and/or fewer to more gates benchmarked simultaneously. However, any suitable progression, including deviations from those described herein, can be used in accordance with example aspects of the present disclosure. The trainable parameters are increasingly constrained by their values learned during previous iterations such that values of a subset of the trainable parameters are learned in each iteration until all values are known at the end of the final iteration.

The method 1600 can include, for instance, at 1604, determining (e.g., by the one or more computing devices) first parameter values of a first set of trainable parameters of the one or more trainable parameters based at least in part on a first set of error indicators as training features and a first benchmark as a training target. In some implementations, the first benchmark can be an isolated benchmark, such as an Isolated 1Q XEB benchmark and/or an Isolated 2Q XEB benchmark.

The method 1600 can include, at 1606, determining (e.g., by the one or more computing devices) second parameter values of a second set of trainable parameters of the one or more trainable parameters based at least in part on a second set of error indicators as training features and a second benchmark of the plurality of benchmarks as a training target. In some implementations, the second benchmark can be a parallel benchmark, such as a Parallel 1Q XEB benchmark and/or a Parallel 2Q XEB benchmark.

The first set of trainable parameters can be constrained by the first parameter values of the first set of trainable parameters during training of the second set of trainable parameters. For instance, in some implementations, the first set of trainable parameters is constrained by at least one of rigid constraint (e.g., rigidly fixing the parameters) or penalized constraint (e.g., penalizing the trainer for deviating from the parameter values) during training of the second set of trainable parameters.

In some implementations, the method 1600 can optionally include sampling one or more benchmark samples respective to the first benchmark and the second benchmark and training the benchmark model based at least in part on the one or more benchmark samples to learn the first parameter values of the first set of trainable parameters and the second parameter values of the second set of trainable parameters. For instance, the one or more benchmark samples can be used to construct training data as described herein. The benchmark samples can be taken with respect to, for example, gates G, operating parameters p, and/or calibration data D and/or stored in a training data table, such as the training data table 500 of FIG. 6. The one or more benchmark samples can then be used as training data to train the benchmark model. The one or more benchmark samples can include, for example, the first set of error indicators and/or the second set of error indicators. For instance, the set of error indicators associated with the benchmark model can be computed based at least in part on the one or more benchmark samples.

Sampling the one or more benchmark samples can performed according to any suitable sampling technique, such as at least one of focused sampling, random sampling, sweep sampling, or parallel sampling. In some implementations, determining first parameter values of the first set of trainable parameters and/or second parameter values of the second set of trainable parameters further includes filtering the one or more benchmark samples to discard anomalous samples of the one or more benchmark samples.

In some implementations, the benchmarks of the iterative training process can progress in order of complexity. For instance, in some implementations, the first benchmark may benchmark fewer quantum gates than the second benchmark. For example, the first benchmark may be a 1Q XEB benchmark and/or the second benchmark may be a 2Q XEB benchmark. As another example, in some implementations, the first set of error indicators can include fewer error indicators than the second set of error indicators. For instance, in some implementations, the method further comprising sorting the one or more benchmarks based at least in part on prediction complexity, wherein prediction complexity is based at least in part on a length of a minimum subarray of trainable parameters necessary to predict the one or more benchmarks or a length of a subarray of error indicators that are not identically zero for the one or more benchmarks.

In some implementations, a correlation matrix can be used to refine the one or more error indicators to remove, for instance, irrelevant and/or redundant error indicators. For instance, the method 1600 can optionally include computing a correlation matrix of the one or more error indicators indicative of a correlation of the one or more error indicators to at least one of the first benchmark or the second benchmark and refining the one or more error indicators based at least in part on the correlation matrix. The correlation matrix can represent presence of and/or degree of correlation between error indicators and/or benchmarks. As one example, for high-level indicators, indicators that are more strongly correlated with benchmarks are likely to be the most predictive, whereas indicators that are uncorrelated or have a low degree of correlation with benchmarks may be unnecessary for prediction. Information in the correlation matrix (and/or comparable data structures) can be used to refine indicators and/or improve the performance of the model. For instance, the correlation matrix carries information that may be used to refine error indicators and eventually trained models.

In some implementations, the one or more trainable parameters can be associated with a highest-performing trained model that is trained concurrently with a plurality of candidate models. For instance, at the start of a training procedure, desirable model type of the trainable model, such as linear model vs. non-linear model, and/or types of error indicators (e.g., for predictability and/or generalization) may not be explicitly known. Thus, some implementations according to example aspects of the present disclosure can include selecting a trainable model from a plurality of candidate trainable models. Additionally and/or alternatively, some implementations can include selecting the one or more error indicators from a plurality of candidate error indicators. One example framework for selecting the trainable model and/or indicators is k-fold cross validation, where multiple candidate models and/or combinations of error indicators are trained on multiple testing/training/validation training data splits. The model ultimately having the highest performance is selected as the trained benchmark model. Model performance can be evaluated in any suitable method, such as correlation between predicted and measured benchmarks.

The method 1600 can include, at 1608, applying the benchmark model with the first set of trainable parameters and the second set of trainable parameters to determine one or more operating parameters for a quantum computing system. For instance, the benchmark model can be used as an intermediate and/or final model in evaluating an algorithm model to determine the operating parameters for the quantum computing system, as described herein. In some cases, for example, the benchmark model can be decomposed into gate models and used to construct an algorithm model. One example of applying the benchmark model is described in FIG. 18.

FIG. 18 depicts a flow diagram of an example method 1700 for mitigating errors in a quantum computing system comprising a quantum processor according to example embodiments of the present disclosure. The method 1700 can be implemented using any suitable quantum computing system, such as the system described in FIG. 1. As used herein, the term "computing devices" can refer to a classical computing device, quantum computing device, or combination of classical and quantum computing devices. FIG. 18 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

The method 1700 can include, at 1702, obtaining (e.g., by one or more computing devices) data associated with a benchmark model. The benchmark model can include one or more error indicators as features, one or more benchmarks as targets, and/or one or more trainable parameters, wherein each error indicator is associated with a distinct quantum gate calibrated in a distinct operating configuration associated with a plurality of operating parameters for the quantum gate and associated with a calibration data for the operating configuration. Any suitable benchmark model, such as those described in, for example, method 1600 of FIG. 17, can be used in accordance with the present disclosure.

The method 1700 can include, at 1704, decomposing (e.g., by the one more computing devices) the benchmark model into a plurality of quantum gate error models. In some implementation, the benchmark model and/or the quantum gate error models can include algorithm-dependent components and/or algorithm-independent components that can be used in decomposition. The quantum gate models can be models of, for example, 1Q and/or 2Q gates, and/or any other suitable quantum gates. As one example, the plurality of quantum gate error models can include a 1Q quantum gate error model and a 2Q quantum gate error model. The quantum gate models can then be used to construct a quantum algorithm metric model. One example process of decomposing an iteratively trained model into gate error models according to example embodiments of the present disclosure is illustrated in FIG. 12. Any suitable process for decomposing the iteratively trained benchmark model can be employed according to example aspects of the present disclosure.

The method 1700 can include, at 1706, constructing (e.g., by the one or more computing devices) a quantum algorithm metric model for a quantum algorithm based at least in part on the plurality of quantum gate error models. In some implementations, constructing the quantum algorithm metric model can include summing contributions from each of the plurality of quantum gate error models based at least in part on the quantum algorithm. Once constructed, the algorithm metric model can be implemented to mitigate errors in a quantum computing system. For example, the algorithm metric model can be used for in-situ error-mitigation by way of optimizing the algorithm metric model for a quantum algorithm of interest over a plurality of different operating parameters for the quantum computing system. As another example, the error model can be used in the design of quantum processor architectures by providing an optimizable error budget for simulations of the quantum processor architectures over various architectural variables (e.g., electrical circuit configurations, qubit capacitances, Josephson-junction resistances, etc.) during the design of the quantum processor and prior to fabrication of the quantum processor. For example, the method 1700 can include, at 1708, determining (e.g., by the one or more computing devices) one or more operating parameters for the quantum computing system based at least in part on the quantum algorithm metric model.

FIG. 19 depicts a flow diagram of an example method 1800 for generating a benchmark model for a quantum algorithm to be implemented in a quantum computing system having a quantum processor according to example embodiments of the present disclosure. The method 1800 can be implemented using any suitable quantum computing system, such as the system described in FIG. 1. As used herein, the term "computing devices" can refer to a classical computing device, quantum computing device, or combination of classical and quantum computing devices. FIG. 18 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 1802, the method 1800 includes obtaining (e.g. by one or more computing devices) data associated with a benchmark model. The benchmark model can include one or more error indicators as features, one or more benchmarks as targets, and/or one or more trainable parameters, wherein each error indicator is associated with a distinct quantum gate calibrated in a distinct operating configuration associated with a plurality of operating parameters for the quantum gate and associated with a calibration data for the operating configuration. A trainable model can be defined for producing a benchmark model. Defining trainable models generally requires expert knowledge of quantum processor architecture and quantum algorithm of interest. Models may depend on the types of indicators used and/or application for which they are being trained. Example models include linear models, nonlinear models such as, for example, neural network models, and/or quantum simulation models. Any suitable trainable model can be employed according to example aspects of the present disclosure. For instance, in some implementations, the one or more trainable parameters are associated with at least one of a linear model, a nonlinear model, or a quantum simulation model.

The trainable model can be trained based at least in part on a training cost function. The training cost function can provide a distance metric between the trainable model and benchmark samples (e.g., in the training data). One example training cost function is a least-squares L2 cost function. For instance, the least-squares L2 cost function can be defined as: $\text{Cost}(w|G, p, D, B) = \Sigma_{benchmarks}\Sigma_{samples}[\text{Model}(w|G, p, D) - B]^2 + L(w|G, p, D, B)$. The function $L(w|G, p, D, B)$ may be an arbitrary regularization function that may be used to impose constraints on model parameters and/or downselect error indicators. Any suitable cost function can be used in accordance with the present disclosure. Additionally and/or alternatively, the trainable model can be trained based at least in part on a training optimizer. The training optimizer can minimize the cost function with respect to the trainable parameters $w$ to find some output (e.g., optimal or near-optimal) values of the trainable parameters $w^*$. As an example, the training optimizer can solve the generic problem: $w^* \equiv \text{argmin}_w \text{Cost}(w|G, p, D, B)$. One example training optimizer can be or can utilize gradient descent. Any suitable training optimizer can be used in accordance with the present disclosure. Hyperparameters, batch sizes, epochs, etc. can be determined based at least in part on training data, cost function, and/or other suitable parameters.

The benchmark model can be trained according to an iterative supervised-learning training procedure for training the model to predict benchmarks B, according to example aspects of the present disclosure. Generally, the model can be iteratively trained on samples corresponding to one or more judiciously-chosen benchmark types. Some implementations begin with benchmark types requiring the fewest indicators and corresponding model parameters to predict, then progress towards benchmark types requiring the most indicators and corresponding model parameters to predict. This progression can be in the direction from isolated to parallel benchmarks and/or fewer to more gates benchmarked simultaneously. However, any suitable progression, including deviations from those described herein, can be used in accordance with example aspects of the present disclosure. The trainable parameters are increasingly constrained by their values learned during previous iterations such that values of a subset of the trainable parameters are learned in each iteration until all values are known at the end of the final iteration. The constrained trainable parameters can be constrained by at least one of rigid constraint or penalized constraint.

At 1804, the method 1800 can include determining (e.g., by the one or more computing devices) parameter values of the one or more trainable parameters associated with one or more 1Q error mechanisms (e.g. 1Q relaxation error and/or 1Q dephasing error and/or 1Q leakage error and/or 1Q control error) based at least in part on one or more 1Q gate benchmarks (e.g. Isolated 1Q XEB benchmark and/or Isolated 1Q RB benchmark) as a training target. 1Q benchmarks can isolate 1Q error mechanisms and provide for training corresponding model parameters in isolation. After this training operation, the trained parameters can be constrained (e.g. fixed) for future training operations.

At 1806, the method 1800 can include determining (e.g., by the one or more computing devices) parameter values of the one or more trainable parameters associated with 1Q crosstalk based at least in part on a Parallel 1Q gate benchmark (e.g., Parallel 1Q XEB benchmark and/or Parallel 1Q RB benchmark) as a training target, wherein the parameter values of the one or more trainable parameters associated with 1Q error mechanisms are constrained. Compared to the Isolated 1Q XEB benchmark, this benchmark is additionally sensitive to crosstalk between 1Q gates. After this training operation, the trained parameters can be constrained (e.g. fixed) for future training operations.

At 1808, the method 1800 can include determining (e.g., by the one or more computing devices) parameter values of the one or more trainable parameters associated with 2Q error mechanisms (e.g. 2Q relaxation error and/or 2Q dephasing error and/or 2Q control error and/or 2Q leakage error) based at least in part on an Isolated 2Q gate benchmark (e.g. Isolated 2Q XEB benchmark and/or Isolated 2Q RB benchmark) as a training target, wherein the parameter values of the one or more trainable parameters associated with 1Q error mechanisms and 1Q crosstalk are constrained. Compared to the Parallel 1Q gate benchmark, this benchmark is additionally sensitive to 2Q error mechanism(s). After this training operation, the trained parameters can be constrained (e.g. fixed) for future training operations.

At 1810, the method 1800 can include determining (e.g., by the one or more computing devices) parameter values of the one or more trainable parameters associated with 2Q crosstalk based at least in part on a Parallel 2Q gate benchmark (e.g. Parallel 2Q XEB benchmark and/or Parallel 2Q RB benchmark) as a training target, wherein the parameter values of the one or more trainable parameters associated with 1Q error mechanism(s), 1Q crosstalk, 2Q error mechanism(s) are constrained. Compared to the Isolated 2Q gate benchmark, this benchmark is additionally sensitive to crosstalk between 2Q gates. After this training operation, the trained parameters can be constrained (e.g. fixed) for future training operations).

The method 1800 can include, at 1812, applying the benchmark model with the first set of trainable parameters and the second set of trainable parameters to determine one or more operating parameters for a quantum computing system. For instance, the benchmark model can be used as an intermediate and/or final model in evaluating an algorithm model to determine the operating parameters for the quantum computing system, as described herein. In some cases, for example, the benchmark model can be decomposed into gate models and used to construct an algorithm model. One example of applying the benchmark model is described in FIG. 18.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for generating a benchmark model for a quantum algorithm to be implemented in a quantum computing system having a quantum processor, the method comprising:

obtaining, by one or more computing devices, data associated with a benchmark model, the benchmark model having one or more error indicators as features, one or more benchmarks as targets, and one or more trainable parameters, wherein each error indicator is associated with a distinct quantum gate calibrated in a distinct operating configuration associated with a plurality of operating parameters for the quantum gate and associated with a calibration data for the operating configuration;

determining, by the one or more computing devices, first parameter values of a first set of trainable parameters of the one or more trainable parameters based at least in part on a first set of error indicators as training features and a first benchmark as a training target; and determining, by the one or more computing devices, second parameter values of a second set of trainable parameters of the one or more trainable parameters based at least in part on a second set of error indicators as training features and a second benchmark as a training target;

wherein the first set of trainable parameters is constrained by the first parameter values of the first set of trainable parameters during training of the second set of trainable parameters.

2. The computer-implemented method of claim 1, wherein the first benchmark comprises an isolated benchmark and the second benchmark is associated with a parallel benchmark.

3. The computer-implemented method of claim 1, wherein the first benchmark is associated with fewer quantum gates than the second benchmark.

4. The computer-implemented method of claim 1, wherein the first set of error indicators comprises fewer error indicators than the second set of error indicators.

5. The computer-implemented method of claim 1, wherein the method further comprises:

sampling one or more benchmark samples respective to the first benchmark and the second benchmark; and training the benchmark model based at least in part on the one or more benchmark samples to learn the first parameter values of the first set of trainable parameters and the second parameter values of the second set of trainable parameters.

6. The computer-implemented method of claim 5, wherein sampling the one or more benchmark samples is performed according to at least one of focused sampling, random sampling, sweep sampling, or parallel sampling.

7. The computer-implemented method of claim 5, wherein determining first parameter values of the first set of trainable parameters further comprises filtering the one or more benchmark samples to discard anomalous samples of the one or more benchmark samples.

8. The computer-implemented method of claim 5, wherein the one or more error indicators are computed based at least in part the one or more benchmark samples.

9. The computer-implemented method of claim 1, wherein the method further comprises:

computing a correlation matrix of the one or more error indicators indicative of a correlation of the one or more error indicators to at least one of the first benchmark or the second benchmark; and refining the one or more error indicators based at least in part on the correlation matrix.

10. The computer-implemented method of claim 1, wherein the one or more trainable parameters are associated with at least one of a linear model, a non-linear model, or a quantum simulation model.

11. The computer-implemented method of claim 10, wherein the one or more trainable parameters are associated with a trained model that is trained concurrently with a plurality of candidate models.

12. The computer-implemented method of claim 1, wherein the first set of trainable parameters is constrained by at least one of rigid constraint or penalized constraint during training of the second set of trainable parameters.

13. The computer-implemented method of claim 1, further comprising sorting the one or more benchmarks based at least in part on prediction complexity, and wherein prediction complexity is based at least in part on a length of a minimum subarray of trainable parameters necessary to predict the one or more benchmarks or a length of a subarray of error indicators that are not identically zero for the one or more benchmarks.

14. The computer-implemented method of claim 1, wherein the trainable parameters are trained based at least in part on a training cost function providing a distance metric between the one or more trainable parameters and the one or more benchmarks.

15. A computer-implemented method for mitigating errors in a quantum computing system comprising a quantum processor, the method comprising:

obtaining, by one or more computing devices, a benchmark model;

decomposing, by the one more computing devices, the benchmark model into a plurality of quantum gate error models;

constructing, by the one or more computing devices, a quantum algorithm metric model for a quantum algorithm based at least in part on the plurality of quantum gate error models; and determining, by the one or more computing devices, one or more operating parameters for the quantum computing system based at least in part on the quantum algorithm metric model.

16. The computer-implemented method of claim 15, wherein the plurality of quantum gate error models comprise a single qubit (1Q) quantum gate error model and a two-qubit (2Q) quantum gate error model.

17. The computer-implemented method of claim 15, wherein the benchmark model and the plurality of quantum gate error models each comprises an algorithm-independent component and an algorithm-dependent component.

18. The computer-implemented method of claim 15, wherein constructing the quantum algorithm metric model comprises summing contributions from each of the plurality of quantum gate error models based at least in part on the quantum algorithm.

19. The computer-implemented method of claim 15, further comprising:

operating the quantum computing system using the determined one or more operating parameters.

20. A computer-implemented method for generating a benchmark model for a quantum algorithm to be implemented in a quantum computing system having a quantum processor, the method comprising:

obtaining, by one or more computing devices, data associated with a benchmark model, the benchmark model having one or more error indicators as features, one or more benchmarks as targets, and one or more trainable parameters, wherein each error indicator is associated with a distinct quantum gate calibrated in a distinct operating configuration associated with a plurality of operating parameters for the quantum gate and associated with a calibration data for the operating configuration;

determining, by the one or more computing devices, parameter values of the one or more trainable parameters associated with one or more single qubit (1Q) error mechanisms based at least in part on an Isolated 1Q gate benchmark as a training target;

determining, by the one or more computing devices, parameter values of the one or more trainable parameters associated with 1Q crosstalk based at least in part on a parallel 1Q gate benchmark as a training target, wherein the parameter values of the one or more trainable parameters associated with the one or more 1Q error mechanisms are constrained;

determining, by the one or more computing devices, parameter values of the one or more trainable parameters associated with one or more two-qubit (2Q) error mechanisms based at least in part on an Isolated 2Q gate benchmark as a training target, wherein the parameter values of the one or more trainable parameters associated with the one or more 1Q error mechanisms and 1Q crosstalk are constrained; and determining, by the one or more computing devices, parameter values of the one or more trainable parameters associated with 2Q crosstalk based at least in part on a Parallel 2Q gate benchmark as a training target, wherein the parameter values of the one or more trainable parameters associated with the one or more 1Q error mechanisms 1Q crosstalk, and one or more 2Q error mechanisms are constrained.

\* \* \* \* \*